(12) United States Patent
Meguro et al.

(10) Patent No.: US 7,368,188 B2
(45) Date of Patent: May 6, 2008

(54) MAGNETIC RECORDING MEDIUM

(75) Inventors: Katsuhiko Meguro, Kanagawa (JP); Masatoshi Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 535 days.

(21) Appl. No.: 11/037,060

(22) Filed: Jan. 19, 2005

(65) Prior Publication Data
US 2005/0202288 A1    Sep. 15, 2005

(30) Foreign Application Priority Data
Jan. 30, 2004   (JP)   ............... P.2004-023667
Jan. 30, 2004   (JP)   ............... P.2004-023668

(51) Int. Cl.
*G11B 5/33*   (2006.01)
*G11B 5/716*  (2006.01)
*B32B 5/10*   (2006.01)

(52) U.S. Cl. ............... 428/839.6; 428/844; 428/847.2; 428/482

(58) Field of Classification Search ........ 428/837, 428/838, 839.6, 844, 844.1, 847, 847.4, 847.2, 428/847.3, 847.6, 848.2, 900, 482, 9; 521/48; 522/104
See application file for complete search history.

(56) References Cited

U.S. PATENT DOCUMENTS 6,432,503 B2 *  8/2002  Aonuma et al. .......... 428/336
6,521,361 B2 *  2/2003  Ejiri et al. .................. 428/838
6,713,155 B1 *  3/2004  Handa et al. ............. 428/847.4
2003/0211362 A1 * 11/2003 Ohno ......................... 428/838
2003/0232217 A1 * 12/2003 Meguro et al. ............. 428/847

FOREIGN PATENT DOCUMENTS

| EP | 1142936    | * | 10/2000 |
| JP | 8-45060 A  |   | 2/1996  |
| JP | 8-227517 A |   | 9/1996  |
| WO | WO 00/79524|* | 12/2000 |

OTHER PUBLICATIONS

English Abstract JA 08-227517.*
English Translation JA 08-227517.*
English Abstract JA 08-045060.*
English Translation JA 08-045060.*

* cited by examiner

*Primary Examiner*—Carol Chaney
*Assistant Examiner*—Louis Falasco
(74) *Attorney, Agent, or Firm*—Sughrue Mion, PLLC

(57) ABSTRACT

A magnetic recording medium including a polymer support having thereon at least one magnetic layer containing a ferromagnetic metal powder having an average major axis length of from 20 to 100 nm or a ferromagnetic hexagonal ferrite powder having an average tabular diameter of from 5 to 40 nm and a binder, the polymer support having an intrinsic viscosity of from 0.47 to 0.51 dL/g, a Young's modulus in the machine direction of from 7.0 to 8.6 GPa, a Young's modulus in the transverse direction of from 5.4 to 8.0 GPa, and a breaking strength in the transverse direction of from 370 to 450 MPa.

15 Claims, No Drawings

MAGNETIC RECORDING MEDIUM

This application is based on Japanese Patent application JP 2004-023667, filed Jan. 30, 2004, the entire content of which is hereby incorporated by reference.

BACKGROUND OF THE INVENTION

1. Technical Field of the Invention

The present invention relates to a magnetic recording medium comprising a polymer support having thereon a magnetic layer containing a ferromagnetic powder and a binder and further to a magnetic recording medium having an excellent electromagnetic conversion characteristic and reliability.

2. Description of the Related Art

In the magnetic recording field, putting digital recording which is small in deterioration of recording to practical use is developing in place of the conventional analog recording. In recording and reproducing equipment and magnetic recording media which are used in digital recording, not only high image quality and high sound quality, but also miniaturization and space reduction are required. However, in general, since much signal recording is necessary in the digital recording as compared with the analog recording, the digital recording is required to realize recording with a higher density.

In recent years, a reproducing head applying magnetic resistance (MR) as an actuation principle was proposed and began to be used in a hard disc, etc. Also, JP-A-8-227517 proposes to apply the reproducing head to a magnetic tape. In an MR head, since a reproducing output of several times as compared with an induction type magnetic head is obtained and an induction coil is not used, by largely lowering noises of instruments such as an impedance noise to lower a noise of a magnetic recording medium, it becomes possible to obtain a large SN ratio. In other words, if the noise of the magnetic recording medium hidden in a conventional instrument is made small, good recording and reproduction can be achieved, and a high-density recording characteristic can be greatly improved.

So far, in magnetic recording media, ones comprising a support having thereon a magnetic layer having Co-modified iron oxide, $CrO_2$, a ferromagnetic metal powder, or a hexagonal ferrite powder dispersed in a binder are widely used. For the sake of reducing the noise, various measures may be considered. In particular, it is effective to decrease the size of a grain of the ferromagnetic powder. In recent magnetic materials, ferromagnetic metal fine powders having an average major axis length of not more than 100 nm are used, thereby enhancing the effect.

In order to achieve the foregoing high-density recording, it is necessary to realize shorter the wavelength of a recording signal or to make the recording tracks narrow. For achieving this, in addition to realization of fine division of a ferromagnetic powder, high packing and ultra-smoothening of the surface of a magnetic recording medium, it is required to make a magnetic recording medium thin for the purpose of improving the volume density.

In general, a coating type magnetic recording medium has a structure in which a magnetic layer is provided on a support, or a non-magnetic layer and a magnetic layer are provided in this order on a support. For the sake of making the foregoing magnetic recording medium thin, it is required to make not only the magnetic layer but also the whole of layers constructing the magnetic recording medium thin. For the purpose of making the thickness of the magnetic recording medium thin, it has hitherto been carried out to make the support thin or to make the non-magnetic layer thin. However, if the support is made thin exceeding a certain range, the running durability is lowered; and if the non-magnetic layer is made thin, a lowering of the output, an increase of the error rate, and an increase of the dropout are introduced.

That is, if thinning of the magnetic recording medium advances for the purpose of increasing the recording density, a sufficient leveling effect against the support is not obtained in the magnetic layer, and the surface state of the support provided beneath the magnetic layer largely influences the surface of the magnetic layer. It may be considered that the principal cause resides in very small protrusions (so-called fish eyes) scattered on the surface of the support; the fish eyes become an anti-blocking filler, thereby lifting up the surface of the magnetic layer to form protrusions; and the dropout is generated due to these protrusions. In particular, in a linear recording system, since a magnetic tape runs substantially in parallel to a magnetic head and comes into contact with the head, the dropout caused due to protrusions present on the surface of the magnetic layer is liable to be generated.

In order to prevent the dropout caused by the foregoing protrusions on the magnetic layer, it is necessary to change the filler contained in the support and smoothen the surface of the support. However, if the filler contained in the support is changed, the film formation step of a support, the production step of a magnetic recording medium, and the running properties within a drive after forming a tape are greatly influenced, and therefore, it cannot be said that this is an effective method. For this reason, a support having two or more layers in which the surface properties are made different between the side of the support at which a magnetic layer is provided and the side of the back surface against the former.

Further, it is known that even if the support, especially the surface of the magnetic layer is smoothened, a stain is accumulated on the head, resulting in the occurrence of dropout. This is caused by the matter that an edge debris formed when an end face of the support is shaven by a running system within the drive is accumulated, and this end face is generated by slitting.

Now, for the purpose of preventing a poor pancake shape from the occurrence by preventing a high edge of an end portion generated in the slitting step, JP-A-8-45060 describes a magnetic recording medium using a support made of polyethylene naphthalate having a thickness of 4 μm or more and regulated so as to have a ratio of the Young's modulus in the machine direction to the Young's modulus in the transverse direction of from 0.4 to 1.5 and a viscosity of from 0.45 to 0.53.

The foregoing definition of the physical properties of the support is extremely broad and unclear. Also, only the foregoing definition is insufficient as a support for the recent magnetic recording media having an improved recording density. Since this JP-A-8-45060 discloses neither unit nor measurement method regarding the density, its invention is obscure. Also, with respect to the raw material of the support to be used, only the polyethylene naphthalate is described, but no description regarding its layer construction and surface properties is given.

As described above, according to the conventional supports, it is difficult to provide a magnetic recording medium adapted for the recent demand of high recording density.

SUMMARY OF THE INVENTION

An object of the invention is to provide a magnetic recording medium which does not form an edge debris and can effectively prevent an increase of the error rate while meeting stable running properties.

The means for solving the foregoing problems are as follows.

(1) A magnetic recording medium comprising a polymer support having thereon at least one magnetic layer containing a ferromagnetic metal powder having an average major axis length of from 20 to 100 nm or a ferromagnetic hexagonal ferrite powder having an average tabular diameter of from 5 to 40 nm and a binder, the polymer support having an intrinsic viscosity of from 0.47 to 0.51 dL/g, a Young's modulus in the machine direction of from 7.0 to 8.6 GPa, a Young's modulus in the transverse direction of from 5.4 to 8.0 GPa, and a breaking strength in the transverse direction of from 370 to 450 MPa.

(2) The magnetic recording medium as set forth above in (1), wherein the polymer support is a laminated polyester film having a thickness of not more than 8 µm and comprising at least two layers, in which a contact stylus three-dimensional surface roughness SRa(A) of the surface (A surface) in the side at which the magnetic layer is provided is from 1 to 6 nm, and a contact stylus three-dimensional surface roughness SRa(B) of the back surface (B surface) against the A surface is from 6 to 10 nm, with SRa(A) and SRa(B) being satisfied with the relationship of [SRa(A)<SRa(B)].

(3) A magnetic recording medium comprising a polymer support having thereon at least one magnetic layer containing a ferromagnetic metal powder having an average major axis length of from 20 to 100 nm or a ferromagnetic hexagonal ferrite powder having an average tabular diameter of from 5 to 40 nm and a binder, the polymer support having a number average molecular weight (Mn) of from 12,000 to 18,000, a weight average molecular weight (Mw) of from 32,000 to 40,000, a Young's modulus in the machine direction of from 7.0 to 8.6 GPa, and a Young's modulus in the transverse direction of from 5.4 to 8.0 GPa.

(4) The magnetic recording medium as set forth above in (3), wherein the polymer support is a laminated polyester film having a thickness of not more than 8 µm and comprising at least two layers, in which a contact stylus three-dimensional surface roughness SRa(A) of the surface (A surface) in the side at which the magnetic layer is provided is from 1 to 6 nm, and a contact stylus three-dimensional surface roughness SRa(B) of the back surface (B surface) against the A surface is from 6 to 10 nm, with SRa(A) and SRa(B) being satisfied with the relationship of [SRa(A)<SRa(B)].

The invention can provide a magnetic recording medium capable of keeping a good error rate without forming an edge debris by controlling the physical properties of a polymer support, i.e., an intrinsic viscosity or Mn and Mw and Young's moduli in the machine direction and transverse direction.

DETAILED DESCRIPTION OF THE INVENITON

The invention has been made based on the finding that a cause of forming an edge debris resides in the matter that when a magnetic recording medium is slit, if the Young's modulus or breaking strength of a polymer support is too high, a slitting blade excessively comes into the polymer support, thereby expanding an end face of the support.

The breaking strength of the polymer support changes by the molecular weight (intrinsic viscosity) of a polymer to be used in the support, the stretching condition (Young's modulus) at the time of film formation, etc.

The magnetic recording medium according to the first embodiment of the invention can improve the end face shape by slitting, i.e., the slitting properties, in its turn control the formation of an edge debris, and keep a good error rate by controlling the polymer support with respect to the intrinsic viscosity, the Young's moduli in the machine direction and transverse direction and the breaking strength in the transverse direction.

The intrinsic viscosity as referred to in the invention means an intrinsic viscosity of the whole of a polymer material constituting the polymer support and means one determined by plotting a concentration of the polymer support (provided that insoluble solids such as a powder are eliminated) upon dissolution in a mixed solvent of phenol and 1,1,2,2-tetrachloroethane (weight ratio: 60/40) on the abscissa and plotting one obtained by measuring a relative viscosity corresponding to the solution at 25° C. using a Ubbelohde's viscometer on the ordinate and then extrapolating the point at which the concentration is 0.

In the first embodiment of the invention, the intrinsic viscosity of the polymer support is from 0.47 to 0.51 dL/g, and preferably from 0.47 to 0.50 dL/g. By making the intrinsic viscosity fall within the foregoing range, not only the film forming properties and the strength are ensured, but also the slitting properties in the slitting step are kept good. When the intrinsic viscosity is less than 0.47 dL/g, the degree of polymerization is low so that the film forming properties and the strength are not increased. On the other hand, when it exceeds 0.51 dL/g, the slitting properties in the slitting are lowered.

Also, the Young's modulus of the polymer support changes by the molecular weight of a polymer to be used in the support, the stretching condition at the time of film formation, etc.

The magnetic recording medium according to the second embodiment of the invention can improve the end face shape by slitting, i.e., the slitting properties, in its turn control the formation of an edge debris, and keep a good error rate by controlling the polymer support with respect to the Mn and Mw and the Young's moduli in the machine direction and transverse direction.

The terms "Mn" and "Mw" as referred to in the invention each means one determined from a calibration curve prepared by dissolving the polymer support in hexafluoroisopropnaol (HFIP) (provided that insoluble solids such as a powder are eliminated), charging this solution in GPC, HLC-8220 manufactured by Tosoh Corporation (column construction: Super HM-M×2, column vessel temperature: 40° C.), using the same HFIP as an eluting solution, and using polymethyl methacrylate (PMMA) having a known molecular weight. Incidentally, a polymer material constituting the polymer support may be any of one comprising repeating units having the same structure (inclusive of copolymers) as described later or one comprising repeating units having a different structure from each other. Therefore, the terms "Mn" and "Mw" as referred to in the invention do not mean only Mn and Mw of a polymer material comprising repeating units having the specific identical structure but are a concept including of all of polymer species constituting the polymer support.

In the second embodiment of the invention, the Mn of the polymer support is from 12,000 to 18,000, and preferably from 14,000 to 17,000; and the Mw of the polymer support is from 32,000 to 40,000, and preferably 33,000 to 38,000. By making the Mn and Mw of the polymer support fall within the foregoing ranges, not only the film forming properties and the strength are ensured, but also the slitting properties in the slitting step are kept good. When the Mn is less than 12,000 or the Mw is less than 32,000, the degree of polymerization is low so that the film forming properties and the strength are not increased. On the other hand, when the Mn exceeds 18,000 or the Mw exceeds 40,000, the slitting properties in the slitting are lowered.

In the invention, the Young's modulus and breaking strength of the polymer support are values measured by cutting the polymer support into specimen length and width of 100 mm and 5 mm, respectively and drawing the specimen at a rate of 100 mm/min under the circumference at 25° C. and 50% RH according to the method defined in JIS K7113 (1995). Incidentally, in the case where the Young's modulus in the machine direction (MD) is measured, the polymer support is cut such that the machine direction of the specimen length is in parallel to the machine direction of the polymer support; and in the case where the Young's modulus or breaking strength in the transverse direction (TD) is measured, the polymer support is cut such that the machine direction of the specimen length is in parallel to the transverse direction of the polymer support. Also, in the case where a sample only made of the polymer support, which is provided for the measurement, is not obtained, a polymer support obtained by peeling a layer from the magnetic recording medium may be used. In this case, in the case of where the magnetic recording medium is a magnetic tape, MD of the polymer support is coincident with MD of the magnetic tape; and in the case where the magnetic recording medium is a magnetic disc, the machine direction of stripes or scratches generated on the surface of the magnetic layer at the time of coating or calender treatment as observed upon observation of the surface of the magnetic layer by, for example, a differential interference microscope (power: from 50 to 200 times) is defined as MD of the polymer support, and the direction perpendicular thereto is defined as TD of the polymer support.

In the first embodiment of the invention, the breaking strength of the polymer support is from 370 to 450 MPa, and preferably from 375 to 450 MPa. By making the breaking strength fall within the foregoing range, not only the film forming properties and the strength are ensured, but also the slitting properties in the slitting step are kept good.

In the invention, the Young's modulus in the machine direction of the polymer support is from 7.0 to 8.6 GPa, and preferably from 7.0 to 8.5 GPa; and the Young's modulus in the transverse direction of the polymer support is from 5.4 to 8.0 GPa, and preferably from 5.6 to 7.8 GPa.

By making the Young's moduli in the machine direction and transverse direction fall within the foregoing ranges, respectively, not only touch with a head is ensured, but also tape folding caused by guide pins of regulating the tape pass during running of the tape is prevented.

In particular, when the Young's modulus in the machine direction exceeds 8.6 GPa, the touch with a head becomes insufficient; and when the Young's modulus in the transverse direction is less than 5.4 GPa, the tape is liable to cause folding by guide pins.

Examples of the polymer support to be used in the invention include biaxially stretched polyethylene naphthalate, polyethylene terephthalate, polyamides (including aromatic polyamides), polyimides, polyamide-imides, and polybenzoxazole. Of these, polyesters comprising a dicarboxylic acid and a diol, such as polyethylene terephthalate and polyethylene naphthalate, are preferable.

Examples of the dicarboxylic acid component as the principal constitutional component in the polyesters include terephthalic acid, isophthalic acid, phthalic acid, 2,6-naphthalenedicarboxylic acid, 2,7-naphthalenedicarboxylic acid, diphenylsulfonedicarboylic acid, diphenyl ether dicarboxylic acid, diphenylethanedicarboxylic acid, cyclohexanedicarboxylic acid, diphenyldicarboxylic acid, diphenylthioether dicarboxylic acid, diphenyl ketone dicarboxylic acid, and phenylindanedicarboxylic acid.

Also, examples of the diol component in the polyesters include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl)sulfone, bisphenol fluorene dihydroxyethyl ether, diethylene glycol, neopentyl glycol, hydroquinone, and cyclohexanediol.

Of the polyesters comprising these compounds as the principal constitutional components, polyesters comprising, as the principal constitutional components, terephthalic acid and/or 2,6-naphthalenedicarboxylic acid as the dicarboxylic acid component and ethylene glycol and/or 1,4-cyclohexanedimethanol as the diol component are preferable from the standpoints of transparency, mechanical strength, dimensional stability, etc.

Above all, polyesters comprising polyethylene terephthalate or polyethylene-2,6-naphthalate as the principal constitutional component, copolymer polyesters comprising terephthalic acid, 2,6-naphthalenedicarboxylic acid and ethylene glycol, and polyesters comprising a mixture of two or more kinds of these polyesters as the principal constitutional components are preferable; and polyesters comprising polyethylene-2,6-naphthalate as the principal constitutional component are especially preferable.

The polyester which constitutes the biaxially stretched polyester film to be used in the invention may further be copolymerized with other copolymerization component or may be mixed with other polyester so far as the effect of the invention is not hindered. Examples thereof include the dicarboxylic components and diol components enumerated previously and polyesters comprising the same.

For the purpose of hardly causing delamination at the time of film formation, the polyester to be used in the invention may be copolymerized with an aromatic dicarboxylic acid having a sulfonate group or an ester forming derivative thereof, a dicarboxylic acid having a polyoxyalkylene group or an ester forming derivative thereof, a diol having a polyoxyalkylene group, etc.

Of these, 5-sodium sulfoisophthalate, 2-sodium sulfoterephthalate, 4-sodium sulfophthalate, and 4-sodium sulfo-2,6-naphthalene dicarboxylate; compounds resulting from substitution of the sodium of these compounds with other metal (for example, potassium and lithium), an ammonium salt, a phosphonium salt, etc. or ester forming derivatives thereof; and polyethylene glycol, polytetramethylene glycol, a polyethylene glycol-polypropylene glycol copolymer, and compounds resulting from conversion of a hydroxyl group at the both ends into a carboxyl group by oxidation, etc. are preferable from the standpoints of polymerization reactivity of the polyester and transparency of the film.

A copolymerization proportion for this purpose is preferably from 0.1 to 10% by mole based on the dicarboxylic acid which constitutes the polyester.

Also, for the purpose of enhancing the heat resistance, it is possible to copolymerize the polyester with a bisphenol based compound or a compound having a naphthalene ring or a cyclohexane ring. The copolymerization proportion thereof is preferably from 1 to 20% by mole based on the dicarboxylic acid which constitutes the polyester.

The synthesis method of the polyester to be used in the invention is not particularly limited, but conventionally known production methods of polyesters can be employed. For example, a direct esterification method of directly esterifying the dicarboxylic acid component and the diol component; and an ester exchange method in which a dialkyl ester is first used as the dicarboxylic acid component and then subjected to ester exchange reaction with the diol component, and the reaction mixture is heated in vacuo to remove the excessive diol component, thereby achieving polymerization can be employed. In this case, if desired, an ester exchange catalyst or a polymerization reaction catalyst may be used, or a heat resistant stabilizer may be added.

Also, one or two or more kinds of various additives such as a coloration preventive agent, an antioxidant, a crystal nucleating agent, a slipping agent, a stabilizer, a blocking preventive agent, an ultraviolet light absorber, a viscosity modifier, a defoaming clarifier, an antistatic agent, a pH modifier, a dye, a pigment, and a reaction stopping agent may be added in each of the steps at the time of the synthesis. These compounds may be used for the production of a polymer support made of other material than the polyester.

In the synthesis of the polymer as a raw material of the polymer support to be used in the invention, the method of adjusting its intrinsic viscosity is not particularly limited. For example, the intrinsic viscosity can be adjusted by controlling the reaction time, reaction temperature, reaction solvent, pressure, concentration of starting monomer, catalyst, etc. in polymerizing the starting monomers. Also, in the synthesis, there is employable a method in which the reaction mixture is collected and measured for the viscosity corresponding to the advance of the reaction, and when the viscosity reaches a desired value, the reaction is stopped. Also, for example, there is employable a method in which correspondence of the intrinsic viscosity to a torque to be applied to a stirrer of a polymerization vessel is previously examined, and when the torque reaches a prescribed value, the reaction is stopped. Also, in the case of polycondensation reaction of, e.g., a polyester, there can be employed a method in which correspondence of the intrinsic viscosity to the amount of water (at the time of direct polymerization) or an alcohol (at the time of ester exchange reaction) to be discharged from the system at the time of polymerization is previously examined, and the polymerization reaction is stopped at the stage when a prescribed amount of water or the alcohol has been discharged. Also, there may be employed a method in which the polymerization is once carried out to an intrinsic viscosity exceeding the prescribed range, correspondence of the intrinsic viscosity to the melt viscosity is previously examined at the time of film formation, and the residence time of a polymer before and/or after melting within an extruder such that the melt viscosity falls within a prescribed range. These methods are merely enumerated as one example, and it should not be construed that the invention is limited to these methods.

Further, as the polymer support in the invention, a contact stylus three-dimensional surface roughness SRa(A) of the surface (A surface) in the side at which the magnetic layer is provided is preferably from 1 to 6 nm, and more preferably from 1.5 to 5.5 nm. By making the SRa(A) fall within this range, when formed into a magnetic recording medium, not only the running durability is ensured, but also the output is kept high.

As the polymer support in the invention, a contact stylus three-dimensional surface roughness SRa(B) of the back surface (B surface) of the surface (A surface) in the side at which the magnetic layer is provided is preferably from 6 to 10 nm, and more preferably from 6.5 to 9.0 nm. By making the SRa(B) fall within this range, not only a coefficient of friction of the B surface is kept low such that the handling properties of the film are ensured, but also a phenomenon in which in winding up the film having at least a magnetic layer in the rolled state, offset or shape transfer of the roughness of the B surface into the side of the A surface takes place, thereby roughing the side of the A surface is suppressed.

The B surface may be as it is, or may be provided with a back layer.

In the invention, the SRa(A) and SRa(B) mean values measured using a contact stylus three-dimensional surface roughness analyzer according to JIS B0601.

As the polymer material capable of forming the A surface of the polymer support in the invention, ones which usually contain a fine grain usually having a mean grain size of from 30 to 150 nm, and preferably from 40 to 100 nm in an amount of not more than 0.1% by weight, and preferably not more than 0.06% by weight are desirable. From the standpoint of durability of the magnetic layer, it is desirable that the polymer material contains the foregoing fine grain. As this fine grain, silica, calcium carbonate, alumina, a polyacrylic grain, and a polystyrene grain are preferably used.

Further, in the polymer support in the invention, what the B surface is rougher than the A surface is preferable from the standpoints of the film formation of a polymer support, the production step of a magnetic recording medium, and the running properties of a tape.

The method of roughing the B surface is not particularly limited, but a method of mutually laminating two kinds of polymer layers which are different from each other with respect to the type, mean grain size and/or content of a fine grain is preferable. As the method of laminating polymer layers, a co-extrusion method is preferably employed. In this case, it is preferable that the thickness of the polymer layer for forming the B layer is from ½ to 1/10 of the thickness of the whole film. Examples of the fine grain to be used in the polymer layer for forming the B surface include calcium carbonate, silica, alumina, a polystyrene grain, and a silicone resin grain. The mean grain size is preferably from 80 to 800 nm, and more preferably from 100 to 700 nm. The addition amount is preferably from 0.05 to 1.0% by weight, and more preferably from 0.08 to 0.8% by weight.

The laminated polymer support in the invention is a laminated polyester film and can be produced according to conventionally known methods. For example, using a known extruders a polymer material for forming the A surface and a polymer material for forming the B surface are laminated within a die, the laminate is extruded into a sheet-like form from a nozzle at a temperature of the melting point (Tm) to (Tm+70° C.), and the extruded laminate is quenched for solidification at from 40 to 90° C. to obtain a laminated unstretched film. Thereafter, the unstretched film is stretched in the uniaxial direction at a stretching ratio of from 2.5 to 4.5 times, and preferably from 2.8 to 3.9 times at a temperature in the vicinity of from {[glass transition temperature (Tg)]−10} to (Tg+70)° C. and then stretched in the perpendicular direction to the former at a stretching ratio of from 4.5 to 8.0 times, and preferably from 4.5 to 6.0 times at a temperature in the vicinity of from Tg to (Tg+70)° C., and if desired, the stretched film is again stretched in the machine direction and/or the transverse direction to obtain a biaxially oriented film according to the customary manner. That is, the stretching may be carried out at two stages, three stages, four stages, or multiple stages. The total stretching ratio is usually 12 times or more, preferably from 12 to 32 times, and more preferably from 14 to 26 times in terms of area stretching ratio. Further, the biaxially oriented film is subsequently subjected to heat fixing and crystallization at a temperature of from (Tg+70) to (Tm−10)° C., for example, from 180 to 250° C., thereby imparting excellent dimensional stability. Incidentally, the heat fixing time is preferably from 1 to 60 seconds. It is preferred to adjust the rate of heat shrinkage by relaxation at a rate of not more than 3.0%, and preferably from 0.5 to 2.0% in the machine direction and/or the transverse direction by this heat fixing treatment.

Even in the case where the polymer support in the invention is a single layer, it should be clear that the polymer support can be produced according to the foregoing production method of a laminated polymer support.

In the magnetic recording medium in the invention, a ferromagnetic metal powder having an average major axis length of from 20 to 100 nm is used as the ferromagnetic metal powder to be contained in the magnetic layer.

It is known that this ferromagnetic metal powder is excellent with respect to the high-density magnetic recording characteristic, and a magnetic recording medium having an excellent electromagnetic conversion characteristic can be obtained. While the average major axis length of the ferromagnetic metal powder to be used in the magnetic layer of the magnetic recording medium of the invention is from 20 to 100 nm, it is preferably from 30 to 90 nm, and more preferably from 40 to 80 nm. When the average major axis length of the ferromagnetic metal powder is 20 nm or more, a lowering of the magnetic characteristic can be effectively suppressed due to thermal fluctuation. Also, when the average major axis length is not more than 100 nm, good C/N (S/N) can be obtained while keeping a low noise.

The average major axis length of the ferromagnetic metal powder can be determined from a mean value of values measured by a combination of a method in which the ferromagnetic metal powder is photographed by transmission electron microscopic photography and a minor axis length and a major axis length of the ferromagnetic metal power are directly read from the photograph and a method in which the transmission electron microscopic photograph is traced and read by an image analyzer IBASSI, manufactured by Carl Zeiss AG.

Next, the layer construction of the magnetic recording medium of the invention will be described below. So far as the magnetic recording medium of the invention has at least one magnetic layer on at least one surface of the polymer support, its layer construction is not particularly limited. For example, a non-magnetic layer may be provided between the polymer support and the magnetic layer. Also, if desired, a back layer may be provided on the surface opposite to the side of the polymer support. Also, the magnetic recording medium of the invention may be provided with a lubricant coating film or a variety of coating films for protecting the magnetic layer on the magnetic layer as the need arises. Also, it is possible to provide an undercoat layer (easily adhesive layer) between the polymer support and the magnetic layer or non-magnetic layer for the purposes of improving the adhesion between the coating film and the polymer support.

In the magnetic recording medium of the invention, the magnetic layer may be provided on either one surface of the polymer support but can be provided on the both surfaces thereof.

In the construction comprising the non-magnetic layer (lower layer) and the magnetic layer (upper layer), after coating the lower layer, the magnetic layer as the upper layer can be provided in any of the state wherein the lower layer is wet (W/W) or the state wherein the lower layer is dry (W/D).

From the standpoint of productivity, simultaneous or sequential wet coating is preferable. In the multilayered construction of the invention, since the upper layer/lower layer can be simultaneously formed by simultaneous or sequential wet coating (W/W), a surface treatment step such as a calender step can be effectively applied, and even in an ultra-thin layer, the surface roughness of the magnetic layer as the upper layer can be improved.

The constructional elements of the magnetic recording medium of the invention will be described below in more detail.

[Magnetic Layer]

<Ferromagnetic Metal Powder>

The ferromagnetic metal powder to be used in the magnetic layer in the magnetic recording medium of the invention is not particularly limited so far it contains Fe as the major component (inclusive of alloys) but is preferably a ferromagnetic alloy powder containing α-Fe as the major component. Such a ferromagnetic metal powder may contain atoms such as Al, Si, S, Sc, Ca, Ti, V, Cr, Cu, Y, Mo, Rh, Pd, Ag, Sn, Sb, Te, Ba, Ta, X, Re, Au, Hg, Pb, Bi, La, Ce, Pr, Nd, P, Co, Mn, Zn, Ni, Sr, and B in addition to the prescribed atoms. Of these, ones containing at least one of Al, Si, Ca, Y, Ba, La, Nd, Co, Ni, and B in addition to α-Fe are preferable; and ones containing Co, Al and Y are especially preferable. More specifically, ones containing from 10 to 50 atomic % of Co, from 2 to 20 atomic % of Al, and from 1 to 15 atomic % of Y based on Fe are preferable.

The foregoing ferromagnetic metal powder may be previously treated with a dispersant, a wetting agent, a surfactant, an antistatic agent, etc. as describe later. Also, the ferromagnetic metal powder may contain a small amount of water, a hydroxide or an oxide. The water content of the ferromagnetic metal powder is preferably from 0.01 to 2%. It is preferred to optimize the water content of the ferromagnetic metal powder depending upon the type of a binder. It is preferred to optimize the pH of the ferromagnetic metal powder depending upon a combination with a binder to be used. The pH range is usually from 6 to 12, and preferably from 7 to 11. Also, there is the case where the ferromagnetic powder contains inorganic ions such as soluble Na, Ca, Fe, Ni, Sr, $NH_4$, $SO_4$, Cl, $NO_2$, and $NO_3$. It is substantially preferable that the ferromagnetic powder does not contain such inorganic ions. When the total sum of the respective ions is approximately not more than 300 ppm, the characteristics are not affected. Also, it is preferable that the ferromagnetic powder to be used in the invention contains a small volume of voids. Its value is preferably not more than 20% by volume, and more preferably not more than 5% by volume.

The crystallite size of the ferromagnetic metal powder is preferably from 8 to 20 nm, more preferably from 10 to 18 nm, and especially preferably 12 to 16 nm. This crystallite size is a mean value determined from half band widths of diffraction peaks using an X-ray diffraction analyzer (RINT2000 Series, manufactured by Rigaku Denki Co., Ltd.) under conditions of radiation source: CuKα1, X-ray tube voltage: 50 kV, and X-ray tube current: 300 mA according to the Scherrer method.

The specific surface area ($S_{BET}$) of the ferromagnetic metal powder according to the BET method is preferably 30 $m^2/g$ or more and less than 50 $m^2/g$, and more preferably from 38 to 48 $m^2/g$. Within this range, it is possible to cope with both good surface properties and low noises. It is preferred to optimize the pH of the ferromagnetic metal powder by a combination with a binder to be used. The pH range is from 4 to 12, and preferably from 7 to 10. If desired, the ferromagnetic metal powder may be subjected to a surface treatment with Al, Si, P, or oxides thereof. Its amount is from 0.1 to 10% based on the ferromagnetic metal powder. When the surface treatment is applied, the adsorption of a lubricant such as fatty acids becomes not more than 100 $mg/m^2$, and hence, such is preferable. There is the case where the ferromagnetic metal powder contains inorganic ions such as soluble Na, Ca, Fe, Ni, and Sr. In this case, if the amount of the respective ions is approximately not more than 300 ppm, the characteristics are not particularly affected. Also, it is preferable that the ferromagnetic metal powder contains a small volume of voids. Its value is preferably not more than 20% by volume, and more preferably not more than 5% by volume.

Also, so far as the foregoing characteristics regarding the grain size are met, the shape of the ferromagnetic metal powder may be in any of an acicular form, a granular form, a rice grain form, or a tabular form. Especially, it is preferred to use an acicular ferromagnetic metal powder. In the case of an acicular ferromagnetic metal powder, the acicular ratio is preferably from 4 to 12, and more preferably from 5 to 12. The coercive force (Hc) is preferably from 159.2 to 238.8 kA/m (from 2,000 to 3,000 Oe), and more preferably from 167.2 to 230.8 kA/m (from 2,100 to 2,900 Oe). Also, the saturation magnetic flux density is preferably from 150 to 300 mT (from 1,500 to 3,000 G), and more preferably from 160 to 290 mT (from 1,600 to 2,900 G). Also, the saturation magnetization (σs) is from 140 to 170 A·$m^2$/kg (from 140 to 170 emu/g), and more preferably from 145 to 160 A·$m^2$/kg (from 145 to 160 emu/g). It is preferable that SFD (switching field distribution) of the magnetic material itself is small, and the SFD is preferably not more than 0.8. When the SFD is not more than 0.8, the electromagnetic conversion characteristic is good, the output is high, and the reversal of magnetization is sharp so that the peak shift becomes small. Thus, such is suitable for high-density digital magnetic recording. In order to make the Hc distribution small, in the ferromagnetic metal powder, there are methods such as a method of improving the grain size distribution of goethite, a method of using monodispersed α$Fe_2O_3$, and a method of preventing sintering among the grains.

As the ferromagnetic metal powder, ones obtained by known production methods can be used, and the following methods can be enumerated. That is, examples include a method of reducing hydrous iron oxide having been subjected to a sintering preventing treatment or iron oxide with a reducing gas such as hydrogen to obtain an Fe or Fe—Co grain; a method of reducing a composite organic acid salt (mainly an oxalate) with a reducing gas such as hydrogen; a method of thermally decomposing a metallic carbonyl compound; a method of adding a reducing agent such as sodium borohydride, a hypophophite, and hydrazine to an aqueous solution of a ferromagnetic metal to reduce the ferromagnetic metal; and a method of evaporating a metal in a low-pressure inert gas to obtain a powder. The thus obtained ferromagnetic metal powder is subjected to a known gradual oxidation treatment. A method of reducing hydrous iron oxide or iron oxide with a reducing gas such as hydrogen and controlling the partial pressure of an oxygen-containing gas and an inert gas, the temperature and the time to form an oxide film on the surface is preferable because the demagnetization is small.

<Ferromagnetic Hexagonal Ferrite Powder>

Examples of the ferromagnetic hexagonal ferrite powder include barium ferrite, strontium ferrite, lead ferrite, calcium ferrite, and substituted bodies thereof with Co or the like. More specifically, there are enumerated magnetoplumbite type barium ferrite and strontium ferrite, magnetoplumbite type ferrite in which the grain surface is covered by spinel, and magnetoplumbite type barium ferrite and strontium ferrite containing partly a spinel phase. Besides, the ferromagnetic hexagonal ferrite powder may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb in addition to the prescribed atoms. In general, ones having added thereto elements such as Co—Zn, Co—Ti, Co—Ti—Zr, Co—Ti—Zn, Ni—Ti—Zn, Nb—Zn—Co, Sb—Zn—Co, and Nb—Zn can be used. Also, there are ones containing special impurities depending upon the raw material and production method.

As described previously, the grain size of the ferromagnetic hexagonal ferrite powder has an average tabular diameter of from 5 to 40 nm, preferably from 10 to 38 nm, and more preferably from 15 to 36 nm. Also, the average tabular thickness is from 1 to 30 nm, preferably from 2 to 25 nm, and more preferably from 3 to 20 nm. An average tabular ratio {an average of [(tabular diameter)/(tabular thickness)]} is from 1 to 15, and preferably from 1 to 7. When the average tabular ratio falls within the range of from 1 to 15, not only sufficient orientation properties are obtained while keeping high packing properties in the magnetic layer, but also an increase of the noise can be suppressed by stacking among the grains. Also, the specific surface area according to the BET method within the foregoing grain size range is from 10 to 200 $m^2/g$. This specific surface area generally coincides with a calculated value from the tabular diameter and tabular thickness of grain.

In general, it is preferable that the distribution of the tabular diameter and tabular thickness of grain of the ferromagnetic hexagonal ferrite powder is narrow as far as possible. Digitalization of the tabular diameter and tabular thickness of grain can be compared by randomly measuring 500 grains from a grain TEM photograph. In many cases, the distribution of the tabular diameter and tabular thickness of grain is not a normal distribution. However, when the distribution of the tabular diameter and tabular thickness of grain is expressed in terms of a standard deviation against the average size upon calculation, σ/(average size) is from 0.1 to 2.0. In order to make the grain size distribution sharp, not only the grain forming reaction system is made uniform as far as possible, but also the formed grain is subjected to a distribution improving treatment. For example, there is known a method in which ultra-fine grains are selectively dissolved in an acid solution.

Though the coercive force (Hc) of the hexagonal ferrite grain can be made to fall within the range of from 159.2 to 238.8 kA/m (from 2,000 to 3,000 Oe), the coercive force is preferably from 175.1 to 222.9 kA/m (from 2,200 to 2,800 Oe), and more preferably from 183.1 to 214.9 kA/m (from 2,300 to 2,700 Oe). However, in the case where the saturation magnetization (σs) exceeds 1.4 T, the coercive force is preferably not more than 159.2 kA/m. The coercive force (Hc) can be controlled depending upon the grain size (tabular diameter and tabular thickness), the type and amount of an element to be contained, the substitution site of an element, the grain forming reaction condition, and so on.

The saturation magnetization (σs) of the hexagonal ferrite grain is from 40 to 80 A·m$^2$/kg (emu/g). Though it is preferable that the saturation magnetization (σs) is high, the saturation magnetization tends to become small as the grain becomes fine. For the sake of improving the saturation magnetization (σs), it is well known to make the magnetoplumbite ferrite composite with spinel ferrite and to select the type and addition amount of an element to be contained. Also, it is possible to use W-type hexagonal ferrite. In dispersing the magnetic material, it is also performed to treat the surface of the magnetic material grain with a substance adaptive to a dispersion medium and a polymer. As the surface treatment agent, inorganic compounds and organic compounds can be used. Representative examples thereof include oxides or hydroxides of Si, Al, P, etc., a variety of silane coupling agents, and a variety of titanium coupling agents. The addition amount of the surface treatment agent is from 0.1 to 10% by weight based on the weight of the magnetic material. The pH of the magnetic material is also important for the dispersion. The pH is usually from approximately 4 to 12 whiles its optimum value varies depending upon the dispersion medium and polymer. The pH is selected from the range of from approximately 6 to 11 in view of the chemical stability and preservability of the medium. The water content in the magnetic material affects the dispersion, too. The water content is usually selected from 0.01 to 2.0% while its optimum value varies depending upon the dispersion medium and polymer.

Examples of the production method of the ferromagnetic hexagonal ferrite powder include (1) a glass crystallization method in which barium oxide, iron oxide and a metal oxide for substituting iron and boron oxide as a glass forming substance, and the like are mixed and molten so as to have a desired ferrite composition, the melt is quenched to form an amorphous body, and the amorphous body is again heated, washed and then pulverized to obtain a barium ferrite crystal powder; (2) a hydrothermal reaction method in which a barium ferrite composition metal salt solution is neutralized with an alkali, and after removing by-products, and the liquid phase is heated at 100° C. or higher, washed, dried and then pulverized to obtain a barium ferrite crystal powder; and (3) a coprecipitation method in which a barium ferrite composition metal salt solution is neutralized with an alkali, and after removing by-products, the residue is dried, treated at not higher than 1, 100° C. and then pulverized to obtain a barium ferrite crystal powder. The invention does not select the production method. If desired, the ferromagnetic hexagonal ferrite powder may be subjected to a surface treatment with Al, Si, P, or oxides thereof. Its amount is from 0.1 to 10% based on the ferromagnetic metal powder. When the surface treatment is applied, the adsorption of a lubricant such as fatty acids becomes not more than 100 mg/m$^2$, and hence, such is preferable. There is the case where the ferromagnetic metal powder contains inorganic ions such as soluble Na, Ca, Fe, Ni, and Sr. While it is preferable that the ferromagnetic metal powder does not contain such an inorganic ion, if the content of the inorganic ion is not more than 200 ppm, the characteristics are not particularly affected.

<Binder>

The binder to be used in the magnetic layer of the invention includes conventionally known thermoplastic resins, thermosetting resins, reactive resins, and mixtures thereof. Examples of the thermoplastic resins include polymers or copolymers containing, as a constitutional unit, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, vinyl ether, etc., polyurethane resins, and a variety of rubber based resins.

Also, examples of the thermosetting resins or reactive resins include phenol resins, epoxy resins, polyurethane hardening resins, urea resins, melamine resins, alkyd resins, acrylic reactive resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. The thermoplastic resins, thermosetting resins and reactive resins are described in detail in *Plastic Handbook*, published by Asakura Shoten.

Also, when an electron beam curable resin is used in the magnetic layer, not only the coating film strength is enhanced and the durability is improved, but also the surface is made smooth and the electromagnetic conversion characteristic is enhanced. Its examples and production method are described in detail in JP-A-62-256219.

The foregoing resins can be used singly or in combinations thereof. Above all, it is preferred to use a polyurethane resin. Further, it is preferred to use a polyurethane resin obtained by reacting a cyclic structure (for example, hydrogenated bisphenol A and polypropylene oxide adducts of hydrogenated bisphenol A), a polyol having an alkylene oxide chain and having a molecular weight of from 500 to 5,000, a polyol having a cyclic structure and having a molecular weight of from 200 to 500 as a chain extender, and an organic diisocyanate; reacting with a polyurethane resin having a polar group introduced thereinto or an aliphatic dibasic acid (for example, succinic acid, adipic acid, and sebacic acid), a polyester polyol comprising a cyclic structure-free aliphatic diol having an alkyl branched side chain (for example, 2,2-dimethyl-1,3-propanediol, 2-ethyl-2-butyl-1,3-propanediol, and 2,2-diethyl-1,3-propanediol), an aliphatic diol having a branched alkyl side chain having 3 or more carbon atoms (for example, 2-ethyl-2-butyl-1,3-propanediol and 2,2-diethyl-1,3-propanediol) as a chain extender, and an organic diisocyanate compound; reacting with a polyurethane resin having a polar group introduced thereinto or a cyclic structure (for example, dimer diols), a polyol compound having a long chain alkyl chain, and an organic diisocyanate; and introducing a polar group.

The mean molecular weight of the polar group-containing polyurethane based resin to be used in the invention is preferably from 5,000 to 100,000, and more preferably from 10,000 to 50,000. When the mean molecular weight is 5,000 or more, a lowering of the physical strength, such as the matter that the resulting magnetic coating film becomes brittle, does not take place so that the durability of the magnetic recording medium is not affected, and hence, such is preferable. Also, when the mean molecular weight is not more than 100,000, since the solubility in a solvent is not lowered, the dispersibility is good. Also, since the viscosity of the coating material does not increase in a prescribed concentration, the workability is good, and the handling is easy.

Examples of the polar group to be contained in the foregoing polyurethane based resin include —COOM, —SO$_3$M, —OSO$_3$M, —P=O(OM)$_2$, —O—P=O(OM)$_2$ (wherein M represents a hydrogen atom or an alkali metal base), —OH, —NR$_2$, —N$^+$R$_3$ (wherein R represents a hydrocarbon group), an epoxy group, —SH, and —CN. Ones into which at least one of these polar groups has been introduced by copolymerization or addition reaction can be used. Also, in the case where this polar group-containing polyurethane based resin has an OH group, it is preferred from the standpoints of curability and durability to have a branched OH group. The number of the branched OH group to be introduced is preferably from 2 to 40, and more preferably from 3 to 20 per molecule. The amount of the polar group is from $10^{-1}$ to $10^{-8}$ moles/g, and more preferably from $10^{-2}$ to $10^{-6}$ moles/g.

Specific examples of the binder include VAGH, VYHH, VMCH, VAGF, VAGD, VROH, VYES, VYNC, VMCC, XYHL, XYSG, PKHH, PKHJ, PKHC and PKFE (all of which are manufactured by Union Carbide Corporation); MPR-TA, MPR-TA5, MPR-TAL, MPR-TSN, MPR-TMF, MPR-TS, MPR-TM and MPR-TAO (all of which are manufactured by Nissin Chemical Industry Co., Ltd.); 1000W, DX80, DX81, DX82, DX83 and 100FD (all of which are manufactured by Denki Kagaku Kogyo Kabushiki Kaisha); MR-104, MR-105, MR110, MR100, MR555 and 400X-110A (all of which are manufactured by Zeon Corporation); Nipporan N2301, Nipporan N2302 and Nipporan N2304 (all of which are manufactured by Nippon Polyurethane Industry Co., Ltd.); Pandex T-5105, Pandex T-R3080, Pandex T-5201, Burnock D-400, Burnock D-210-80, Crisvon 6109 and Crisvon 7209 (all of which are manufactured by Dainippon Ink and Chemicals, Incorporated); Vylon UR8200, Vylon UR8300, Vylon UR-8700, Vylon RV530 and Vylon RV280 (all of which are manufactured by Toyobo Co., Ltd.); Daiferamine 4020, Daiferamine 5020, Daiferamine 5100, Daiferamine 5300, Daiferamine 9020, Daiferamine 9022 and Daiferamine 7020 (all of which are manufactured by Dainichiseika Color & Chemicals Mfg. Co., Ltd.); MX5004 (manufactured by Mitsubishi Chemical Corporation); Sanprene SP-150 (manufactured by Sanyo Chemical Industries, Ltd.); and Saran F310 and Saran F210 (all of which are manufactured by Asahi Kasei Corporation).

The addition amount of the binder which is used in the magnetic layer of the invention is in the range of from 5 to 50% by weight, and preferably in the range of from 10 to 30% by weight based on the weight of the ferromagnetic metal powder. In the case where a polyurethane resin is used, it is preferred to use a combination containing from 2 to 20% by weight of a polyurethane resin and from 2 to 20% by weight of a polyisocyanate. For example, in the case where a head is corroded due to dechlorination of a slight amount, it is possible to use only a polyurethane or only a polyurethane and a polyisocyanate. In the case where a vinyl chloride based resin is used as other resin, its amount is preferably in the range of from 5 to 30% by weight. In the invention, in the case where a polyurethane is used, it is preferable that the glass transition temperature is from −50 to 150° C., and preferably from 0 to 100° C.; the breaking elongation is from 100 to 2,000%; the breaking stress is from 0.49 to 98 MPa (from 0.05 to 10 kg/mm$^2$); and the yield point is from 0.49 to 98 MPa (0.05 to 10 kg/mm$^2$).

The magnetic recording medium to be used in the invention can be constructed of two or more layers in one side of the polymer support. Accordingly, as a matter of course, it is possible to change the amount of the binder, the amount of the vinyl chloride based resin occupied in the binder, the polyurethane resin, the polyisocyanate, or other resin, the molecular weight and the amount of the polar group of each of the resins for forming the magnetic layer, or the physical characteristics of the resin as described previously depending upon the non-magnetic layer and the respective magnetic layers, as the need arises. However, these parameters should be optimized in each layer, and known technologies regarding multilayered magnetic layers can be applied. For example, in the case where the amount of the binder is changed in each layer, in order to reduce scratches on the surface of the magnetic layer, it is effective to increase the amount of the binder of the magnetic layer; and in order to make head touch against a head good, it is possible to impart flexibility by increasing the amount of the binder of the non-magnetic layer.

Examples of the polyisocyanate which can be used in the invention include isocyanates (for example, tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylenemethane triisocyanate); products between such an isocyanate and a polyalcohol; and polyisocyanates formed by condensation of an isocyanate. Examples of trade names of commercially available isocyanates include Coronate L, Coronate HL, Coronate 2030, Coronate 2031, Millionate MR and Millionate MTL (all of which are manufactured by Nippon Polyurethane Industry Co., Ltd.); Takenate D-102, Takenate D-110N, Takenate D-200 and Takenate D-202 (all of which are manufactured by Takeda Pharmaceutical Company Limited); and Desmodule L, Desmodule IL, Desmodule N and Desmodule HL (all of which are manufactured by Sumitomo Bayer Urethane Co., Ltd.). In each layer, these materials can be used singly or in combinations of two or more thereof utilizing a difference in the curing reactivity.

If desired, an additive can be added in the magnetic layer in the invention. As the additive, an abrasive, a wetting agent, a dispersant, a dispersing agent, an anti-mildew agent, an antistatic agent, an antioxidant, a solvent, carbon black, etc. can be enumerated. Examples of the additive include molybdenum disulfide; tungsten disulfide; graphite; boron nitride; fluorinated graphite; silicone oil; polar group-containing silicones; fatty acid-modified silicones; fluorine-containing silicones; fluorine-containing alcohols; fluorine-containing esters; polyolefins; polyglycols; polyphenyl ethers; aromatic ring-containing organic phosphonic acids (for example, phenylsulfonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid) and alkali metal salts thereof; alkylphosphonic acids (for example, octylphosphonic acid, 2-ethylhexylphosphonic acid, isooctylphosphonic acid, isononylphosphonic acid, isodecylphosphonic acid, isoundecylphosphonic acid, isodecylphosphonic acid, isohexadecylphosphonic acid, isooctadecylphosphonic acid, and isoeicosylphosphonic acid) and alkali metal salts thereof; aromatic phosphoric esters (for example, phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate; toluyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate) and alkali metal salts thereof; phosphoric acid alkyl esters (for example, octyl phosphate, 2-ethylhexyl phosphate, isooctyl phosphate, isononyl phosphate, isodecyl phosphate, isoundecyl phosphate, isodecyl phosphate, isohexadecyl phosphate, isooctadecyl phosphate, and isoeicosyl phosphate) and alkali metal salts thereof; alkylsulfonic esters and alkali metal salts thereof; monobasic fatty acids having from 10 to 24 carbon atoms, which may contain an unsaturated bond or may be branched (for example, lauric acid, myristic acid, palmitic acid, stearic acid, behenic acid, butyl stearate, oleic acid, linolic acid, linoleic acid, elaidic acid, and erucic acid) and metal salts thereof; mono-fatty acid esters, di-fatty acid esters or polyhydric fatty acid esters comprising a monobasic fatty acid having from 10 to 24 carbon atoms, which may contain an unsaturated bond or may be branched, any one of a monohydric to hexahydric alcohol having from 2 to 22 carbon atom, which may contain an unsaturated bond or may be branched, an alkyl alcohol having from 12 to 22 carbon atoms, which may contain an unsaturated bond or may be branched, and a monoalkyl ether of an alkylene oxide adduct (for example, butyl stearate, octyl stearate, amyl stearate, isooctyl stearate, octyl myristate, butyl laurate, butoxyethyl stearate, anhydrosorbitan monostearate, and anhydrosorbitan tristearate); fatty acid amides having from 2 to 22 carbon atoms; and fatty acid amines having from 8 to 22 carbon atoms. Also, ones having an alkyl group, an aryl group, or an aralkyl group, in which a nitro group and a group other than hydrocarbon groups such as halogen-containing hydrocarbons, for example F, Cl, Br, $CF_3$, $CCl_3$, and $CBr_3$, are substituted besides the foregoing hydrocarbon groups may be employed.

Also, nonionic surfactants (for example, alkylene oxide based surfactants, glycerin based surfactants, glycidol based surfactants, and alkylphenol ethylene oxide adducts); cationic surfactants (for example, cyclic amines, ester amides, quaternary ammonium salts, hydantoin derivatives, heterocyclic compounds, phosphoniums, and sulfoniums); anionic surfactants containing an acid group such as a carboxyl group, a sulfonic group, and a sulfuric ester group; and ampholytic surfactants (for example, amino acids, aminosufonic acids, amino alcohol sulfuric or phosphoric esters, and alkyl betaine types) can be used. These surfactants are described in detail in *Surfactant Handbook* (published by Sangyo Tosho Publishing Co., Ltd.).

The foregoing wetting agent and antistatic agent, and the like are not necessarily pure and may contain impurities such as isomers, unreacted compounds, by-products, decomposition products, and oxides in addition to the major components. The content of these impurities is preferably not more than 30% by weight, and more preferably not more than 10% by weight.

Specific examples of these additives include NAA-102, castor oil hydrogenated fatty acids, NAA-42, Cation SA, Nymeen L-201, Nonion E-208, Anon BF and Anon LG (all of which are manufactured by NOF Corporation); FAL-205 and FAL-123 (all of which are manufactured by Takemoto Oil and Fat Co., Ltd.); Enujelub OL (manufactured by New Japan Chemical Co., Ltd.); TA-3 (manufactured by Shin-Etsu Chemical Co., Ltd.); Amide P (manufactured by Lion Armour Co., Ltd.); Duomeen TDO (manufactured by Lion Corporation); BA-41G (manufactured by Nisshin Oil Co., Ltd.); and Profan 2012E, Newpol PE61 and Ionet MS-400 (all of which are manufactured by Sanyo Chemical Industries, Ltd.).

Also, if desired, carbon black can be added to the magnetic layer in the invention. Examples of the carbon black which can be used in the magnetic layer include furnace black for rubber, thermal black for rubber, carbon black for color, and acetylene black. It is preferable that the carbon black has a specific surface area of from 5 to 500 $m^2/g$, a DBP oil absorption of from 10 to 400 mL/100 g, a grain size of from 5 to 300 m$\mu$, a pH of from 2 to 10, a water content of from 0.1 to 10%, and a tap density of from 0.1 to 1 g/mL.

Specific examples of the carbon black which is used in the invention include BLACKPEARLS 2000, 1300, 1000, 900, 905, 800 and 700 and VULCAN XC-72 (all of which are manufactured by Cabot Corporation); #80, #60, #55, #50 and #35 (all of which are manufactured by Asahi Carbon Co., Ltd.); #2400B, #2300, #900, #1000, #30, #40 and #10B (all of which are manufactured by Mitsubishi Chemical Corporation); CONDUCTEX SC, RAVEN 150, 50, 40 and 15 and RAVEN-MY-P (all of which are Columbia Carbon Co.); and Ketchen Black EC (manufactured by Nippon EC K.K.). The carbon black may be subjected to a surface treatment with a dispersant, grafting with a resin, or partial surface graphitization. Also, these carbon blacks can be used singly or in combinations. In the case where the carbon black is used, the carbon black is preferably used in an amount of from 0.1 to 30% by weight based on the weight of the magnetic material. The carbon black has functions to prevent the charging of the magnetic layer, to reduce the coefficient of friction, to impart the light shielding properties, and to enhance the film strength. Such functions vary depending upon the type of the carbon black to be used. Accordingly, as a matter of course, it is possible to properly choose and use the carbon black to be used in the invention by changing the type, the amount and the combination in the magnetic layer and the non-magnetic layer depending upon the purpose based on the various characteristics as defined previously such as the grain size, the oil absorption, the conductivity, and the pH. Rather, they should be optimized for the respective layers. With respect to the carbon black which is used in the magnetic layer of the invention, for example, *Carbon Black Handbook*, complied by the Carbon Black Association of Japan can be made hereof by reference.

As the organic solvent to be used in the invention, known organic solvents can be used. The organic solvent to be used in the invention can be used in an arbitrary ratio, and examples thereof include ketones (for example, acetone, methyl ethyl ketone, methyl isobutyl ketone, diisobutyl ketone, cyclohexanone, isophorone, and tetrahydrofuran); alcohols (for example, methanol, ethanol, propanol, butanol, isobutyl alcohol, isopropyl alcohol, and methylcyclohexanol); esters (for example, methyl acetate, butyl acetate, isobutyl acetate, isopropyl acetate, ethyl lactate, and glycol acetate); glycol ethers (for example, glycol dimethyl ether, glycol monoethyl ether, and dioxane); aromatic hydrocarbons (for example, benzene, toluene, xylene, cresol, and chlorobenzene); chlorinated hydrocarbons (for example, methylene chloride, ethylene chloride, carbon tetrachloride, chloroform, ethylene chlorohydrin, and dichlorobenzene); N,N-dimethylformamide; and hexane.

These organic solvents are not necessarily completely pure and may contain impurities such as isomers, unreacted compounds, by-products, decomposition products, oxides, and moisture in addition to the major components. The content of these impurities is preferably not more than 30% by weight, and more preferably not more than 10% by weight. With respect to the organic solvent to be used in the invention, it is preferable that the type thereof is the same between the magnetic layer and the non-magnetic layer. The addition amount of the organic solvent may be varied. It is important to enhance the coating stability using a solvent having a high surface tension (for example, cyclohexanone and dioxane) in the non-magnetic layer. Specifically, the arithmetical average values of the solvent composition of the upper layer should not be lower than the arithmetical average values of the solvent composition of the non-magnetic layer. For the sake of improving the dispersibility, it is preferable that the polarity is strong to some extent. Among the solvent compositions, it is preferable that a solvent having a dielectric constant of 15 or more is contained in an amount of 50% or more. Also, the solubility parameter is preferably from 8 to 11.

With respect to the dispersant, the wetting agent and the surfactant which are used in the invention, the type and amount thereof can be properly chosen and used in the magnetic layer and the non-magnetic layer as described later as the need arises. As a matter of course, it should not be construed that the invention is limited to the examples described herein. For example, the dispersant has such properties that it causes adsorption or binding at the polar group, and causes adsorption or binding at the polar group mainly on the surface of the ferromagnetic metal powder in the magnetic layer and mainly on the surface of non-magnetic powder in the non-magnetic layer, respectively. For example, it is estimated that an organophosphorus compound having been once adsorbed is hardly desorbed from the surface of the metal or metallic compound, etc. Accordingly, since the surface of the ferromagnetic metal power or the surface of the non-magnetic powder is in the state where it is covered by an alkyl group, an aromatic group, etc., the compatibility of the ferromagnetic metal powder or non-magnetic powder with the binder resin component is enhanced, and the dispersion stability of the ferromagnetic metal powder or non-magnetic powder is further improved. Also, since the wetting agent is present in the free state, there may be considered a method in which the bleed-through onto the surface is controlled by using a fatty acid having a different melting point in each of the non-magnetic layer and the magnetic layer; a method in which the bleed-through onto the surface is controlled by using an ester having a different boiling point or polarity; a method in which the coating stability is enhanced by adjusting the amount of the surfactant; and a method in which the lubricating effect is enhanced by making the addition amount of the lubricant higher in the non-magnetic layer. Also, all or a part of the additives which are used in the invention may be added in any of the steps at the time of producing a coating liquid for magnetic layer or non-magnetic layer. Examples thereof include the case of mixing with the ferromagnetic powder before the kneading step, the case of addition in the kneading step of the ferromagnetic powder, the binder and the solvent, the case of addition in the dispersion step, the case of addition after the dispersion, and the case of addition immediately before coating.

[Non-magnetic Layer]

Next, the detailed contents of the non-magnetic layer will be described below. The magnetic recording medium of the invention can have a non-magnetic layer containing a binder and a non-magnetic powder on the polymer support. The non-magnetic powder which can be used in the non-magnetic layer may be an inorganic substance or an organic substance. Also, carbon black or the like can be used. Examples of the inorganic substance include metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, $ZrO_2$, $SiO_2$, $Cr_2O_3$, α-alumina having a rate of conversion to an α-form of from 90 to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and the like are used singly or in combinations of two or more kinds thereof. Of these, α-iron oxide and titanium oxide are preferable.

The shape of the non-magnetic powder may be any of the acicular, spherical, polyhedral or tabular form. The crystallite size of the non-magnetic powder is preferably from 4 nm to 1 μm, and more preferably from 40 to 100 nm. When the crystallite size falls within the range of from 4 nm to 1 μm, not only the dispersion does not become difficult, but also a proper surface roughness is obtained, and therefore, such is preferable. The mean grain size of the non-magnetic powder is preferably from 5 nm to 2 μm. If desired, it is possible to bring the same effect by combining non-magnetic powders having a different mean grain size from each other or broadening the grain size distribution even in a single non-magnetic powder. The mean grain size of the non-magnetic powder is especially preferably from 10 to 200 nm. When the mean grain size falls within the range of from 5 nm to 2 μm, not only the dispersion is good, but also a suitable surface roughness is obtained, and therefore, such is preferable.

The specific surface area of the non-magnetic powder is from 1 to 100 $m^2/g$, preferably from 5 to 70 $m^2/g$, and more preferably from 10 to 65 $m^2/g$. When the specific surface area falls within the range of from 1 to 100 $m^2/g$, not only a suitable surface roughness is obtained, but also the dispersion can be achieved in a desired amount of the binder, and therefore, such is preferable. The oil absorption using dibutyl phthalate (DBP) is from 5 to 100 mL/100 g, preferably from 10 to 80 mL/100 g, and more preferably from 20 to 60 mL/100 g. The specific gravity is from 1 to 12, and preferably from 3 to 6. The tap density is from 0.05 to 2 g/mL, and preferably from 0.2 to 1.5 g/mL. When the tap density falls within the range of from 0.05 to 2 g/mL, not only the grains are scattered a little so that the operation is easy. Also, the no-magnetic powder tends to hardly fix to the device. The pH of the non-magnetic powder is preferably from 2 to 11, and especially preferably from 6 to 9. When the pH falls within the range of from 2 to 11, the non-magnetic powder is free from an increase of the coefficient of friction caused at high temperature and high humidity conditions or due to the liberation of a fatty acid. The water content of the non-magnetic powder is from 0.1 to 5% by weight, preferably from 0.2 to 3% by weight, and more preferably from 0.3 to 1.5% by weight. When the water content falls within the range of from 0.1 to 5% by weight, not only the dispersion is good, but also the viscosity of the coating material after the dispersion is stable, and therefore, such is preferable. The ignition loss is preferably not more than 20% by weight, and it is preferable that the ignition loss is low.

Also, in the case where the non-magnetic powder is an inorganic powder, ones having a Moh's hardness of from 4 to 10 are preferable. When the Moh's hardness falls within the range of from 4 to 10, it is possible to ensure the durability. The stearic acid adsorption of the non-magnetic powder is preferably from 1 to 20 μmoles/$m^2$, and more preferably from 2 to 15 μmoles/$m^2$. The heat of wetting of the non-magnetic powder to water at 25° C. is preferably in the range of from 200 to 600 erg/$cm^2$ (from 200 to 600 mJ/$m^2$). Also, it is possible to use a solvent whose heat of wetting falls within this range. The amount of the water molecule on the surface at from 100 to 400° C. is properly from 1 to 10 per 100 angstroms. The pH of the isoelectric point in water is preferably from 3 to 9. It is preferable that $Al_2O_3$, $SiO_2$, $TiO_2$, $ZrO_2$, $SnO_2$, $Sb_2O_3$, or ZnO is present on the surface of the non-magnetic powder through a surface treatment. In particular, in view of the dispersibility, $Al_2O_3$, $SiO_2$, $TiO_2$ and $ZrO_2$ are preferable, and $Al_2O_3$, $SiO_2$ and $ZrO_2$ are more preferable. These compounds may be used in combinations. Also, these compounds can be used singly. Also, a surface-treated layer resulting from co-precipitation may be used depending upon the purpose. Also, a method in which the surface layer is first treated with alumina and then treated with silica, or its reversal method may be employed. The surface-treated layer may be a porous layer depending upon the purpose, but it is generally preferable that the surface-treated layer is uniform and dense.

Specific examples of the non-magnetic powder which is used in the non-magnetic layer of the invention include Nanotite (manufactured by Showa Denko K.K.); HIT-100 and ZA-G1 (all of which are manufactured by Sumitomo Chemical Co., Ltd.); DPN-250, DPN-250BX, DPN-245, DPN-270BX, DPB-550BX and DPN-550RX (all of which are manufactured by Toda Kogyo Corp.); titanium oxide, for example, TTO-51B, TTO-55A, TTO-55B, TTO-55C, TTO-55S, TTO-55D, SN-100 and MJ-7 and α-iron oxide, for example, E270, E271 and E300 (all of which are manufactured by Ishihara Sangyo Kaisha, Ltd.); STT-4D, STT-30D, STT-30 and STT-65C (all of which are manufactured by Titan Kogyo Kabushiki Kaisha); MT-100S, MT-100T, MT-150W, MT-500B, T-600B, T-100F and T-500HD (all of which are manufactured by Tayca Corporation); FINEX-25, BF-1, BF-10, BF-20 and ST-M (all of which are manufactured by Sakai Chemical Industry Co., Ltd.); DEFIC-Y and DEFIC-R (all of which are manufactured by Dowa Mining Co., Ltd.); AS2BM and TiO2P25 (all of which are manufactured by Nippon Aerosil Co., Ltd.); 100A and 500A (all of which are manufactured by Ube Industries, Ltd.); and Y-LOP and calcination products thereof (all of which are manufactured by Titan Kogyo Kabushiki Kaisha). Particularly preferred non-magnetic powders are titanium dioxide and α-iron oxide.

By mixing carbon black together with the non-magnetic powder in the non-magnetic layer, it is possible to lower the surface electrical resistance, to reduce the light transmittance and to obtain a desired micro Vickers hardness. The micro Vickers hardness of the non-magnetic layer is usually from 25 to 60 kg/mm$^2$ (from 245 to 588 MPa), and preferably from 30 to 50 kg/mm$^2$ (from 294 to 490 MPa) for the purpose of adjusting the touch with a head. The micro Vickers hardness can be measured using a hardness tester for thin film (HMA-400, manufactured by NEC Corporation) and using a diamond-made triangular pyramid stylus having a sharpness of 80° and a tip radius of 0.1 μm at the tip of an indenter. The light transmittance is generally regulated such that the absorption of infrared light having a wavelength of approximately 900 nm is not more than 3%, for example, in a magnetic tape for VHS, it is not more than 0.8%. For achieving this, furnace black for rubber, thermal black for rubber, carbon black for color, acetylene black, etc. can be used.

The carbon black to be used in the non-magnetic layer of the invention has a specific surface area of from 100 to 500 m$^2$/g, and preferably from 150 to 400 m$^2$/g and a DBP oil absorption of from 20 to 400 mL/100 g, and preferably from 30 to 200 mL/100 g. The carbon black has a grain size of from to 80 nm, preferably from 10 to 50 nm, and more preferably from 10 to 40 nm. The carbon black preferably has a pH of from 2 to 10, a water content of from 0.1 to 10%, and a tap density of from 0.1 to 1 g/mL.

Specific examples of the carbon black which can be used in the non-magnetic layer of the invention include BLACK-PEARLS 2000, 1300, 1000, 900, 800, 880 and 700 and VULCAN XC-72 (all of which are manufactured by Cabot Corporation); #3050B, #3150B, #3250B, #3750B, #3950B, #950, #650B, #970B, #850B and MA-600 (all of which are manufactured by Mitsubishi Chemical Corporation); CONDUCTEX SC and RAVEN 8800, 8000, 7000, 5750, 5250, 3500, 2100, 2000, 1800, 1500, 1255 and 1250 (all of which are Columbia Carbon Co.); and Ketchen Black EC (manufactured by AKZONOBLE).

Also, the carbon black may be subjected to a surface treatment with a dispersant, grafting with a resin, or partial surface graphitization. Also, the carbon black may be dispersed with a binder prior to the addition to the coating material. The carbon black can be used in an amount in the range not exceeding 50% by weight based on the foregoing inorganic powder and in the range not exceeding 40% based on the total weight of the non-magnetic layer. These carbon blacks can be used singly or in combinations. With respect to the carbon black which can be used in the non-magnetic layer of the invention, for example, *Carbon Black Handbook*, complied by the Carbon Black Association of Japan can be made hereof by reference.

Also, an organic powder can be added to the non-magnetic layer depending upon the purpose. Examples of the organic powder include an acrylic-styrene based resin powder, a benzoguanamine resin powder, a melamine based resin powder, and a phthalocyanine based pigment. It is also possible to use a polyolefin based resin powder, a polyester based resin powder, a polyamide based resin powder, a polyimide based resin powder, or a polyethylene fluoride resin. Examples of the production method thereof include those described in JP-A-62-18564 and JP-A-60-255827.

With respect to a binder resin, a lubricant, a dispersant, additives, a solvent, a dispersion method, and others of the non-magnetic layer, those in the magnetic layer can be applied. In particular, with respect to the amount and type of the binder resin and the addition amount and type of the dispersant, known technologies regarding the magnetic layer can be applied.

[Back Layer and Undercoat Layer]

In general, magnetic tapes for recording computer data are strongly required to have repeated running properties as compared with video tapes and audio tapes. For the purpose of keeping such high running durability, it is also possible to provide a back layer on the surface of the polymer support opposite to the surface thereof on which the non-magnetic layer and the magnetic layer are provided. The coating material for back layer is prepared by dispersing granular components such as an abrasive and an antistatic agent and a binder in an organic solvent. Examples of the granular components include a variety of inorganic pigments and carbon black. Also, examples of the binder include nitrocellulose, a phenoxy resin, a vinyl chloride based resin, and a polyurethane. They can be used singly or in admixture thereof.

In the polymer support of the invention, an adhesive layer may be provided on the surface on which the coating material for magnetic layer or the coating material for back layer is coated. Also, the magnetic recording medium of the invention may be provided with an undercoat layer. By providing an undercoat layer, it is possible to enhance an adhesive force between the polymer support and the magnetic layer or the non-magnetic layer. A polyester resin which is soluble in a solvent is used as the undercoat layer. The thickness of the undercoat layer is not more than 0.5 sun.

[Layer Construction]

With respect to the thickness construction of the magnetic recording medium to be used in the invention, the thickness of the polymer support is preferably from 3 to 8 μm. As the polymer support of the magnetic tape, ones having a thickness in the range of from 3 to 7 μm (preferably from 3.5 to 7.5 μm) are used. In the case where the undercoat layer is provided between the polymer support and the non-magnetic layer or the magnetic layer, the thickness of the undercoat layer is from 0.01 to 0.8 μm, and preferably from 0.02 to 0.6 μm. Also, the thickness of the back layer to be provided on the surface of the polymer support opposite to the surface on which the non-magnetic layer and the magnetic layer are provided is from 0.1 to 1.0 μm, and preferably from 0.2 to 0.8 μm.

The thickness of the magnetic layer is optimized depending upon the saturation magnetization of the magnetic head to be used, the head cap length, and the recording signal zone and is in general from 10 to 100 nm, preferably from 20 to 80 nm, and more preferably from 30 to 80 nm. Also, the coefficient of fluctuation in the thickness of the magnetic layer is preferably within ±50%, and more preferably within ±40%. The magnetic layer may comprise at least one layer and may be separated into two or more layers having a different magnetic characteristic from each other, and a known construction regarding the multilayered magnetic layer can be applied.

The thickness of the non-magnetic layer of the invention is from 0.5 to 2.0 μm, preferably from 0.8 to 1.5 μm, and more preferably from 0.8 to 1.2 μm. Incidentally, the non-magnetic layer of the magnetic recording medium of the invention can reveal its effect so far as it is substantially non-magnetic. For example, even when a small amount of a magnetic material is intentionally contained as an impurity, the effect of the invention is revealed, and this construction can be considered substantially identical with that of the magnetic recording medium of the invention. Incidentally, what the construction is substantially identical means that the non-magnetic layer has a residual magnetic flux density of not more than 10 mT or a coercive force of not more than 7.96 kA/m (100 Oe), and preferably has neither residual magnetic flux density nor coercive force.

[Production Method]

The method of producing a coating liquid for magnetic layer of the magnetic recording medium to be used in the invention comprises at least a kneading step, a dispersion step, and a mixing step which is optionally provided prior to or after the foregoing steps. Each of these steps may be divided to two or more stages. All of the raw materials including the ferromagnetic metal powder, the non-magnetic powder, the binder, the carbon black, the abrasive, the antistatic agent, the lubricant, and the solvent may be added at the initial stage of or during any of the steps. Also, the addition of each raw material may be divided across two or more steps. For example, the polyurethane may be divided and added in the kneading step, the dispersion step, and the mixing step for adjusting the viscosity after the dispersion. In order to achieve the object of the invention, a conventionally known production technology can be employed as a part of the step. In the kneading step, it is preferred to use a powerful kneading machine such as an open kneader, a continuous kneader, a pressure kneader, and an extruder. In the case where a kneader is used, all or a part of the binder (preferably 30% or more of the entire binder) is kneaded with the magnetic powder or the non-magnetic powder in an amount in the range of from 15 to 500 parts by weight based on 100 parts by weight of the magnetic material. The details of these kneading treatments are described in JP-A-1-106338 and JP-A-1-79274. Also, for the purpose of dispersing the liquid for magnetic layer and the liquid for non-magnetic layer, glass beads can be used. As the glass beads, dispersion media having a high specific gravity, such as zirconia beads, titania beads, and steel beads, are suitable. These dispersion media are used upon optimization of the grain size and packing density. A known dispersing machine can be used.

In the production method of the magnetic recording medium of the invention, for example, the magnetic layer is formed such that the magnetic coating liquid is coated in a prescribed thickness on the surface of the polymer support under running. Here, a plurality of coating liquids for magnetic layer may be sequentially or simultaneously laminated and coated, and the coating liquid for non-magnetic layer and the coating liquid for magnetic layer may be sequentially or simultaneously laminated and coated. As the coating machine for coating the foregoing coating liquid for magnetic layer or coating liquid for non-magnetic layer, an air doctor coater, a blade coater, a rod coater, an extrusion coater, an air knife coater, a squeeze coater, a dip coater, a reverse roll coater, a transfer roll coater, a gravure coater, a kiss coater, a cast coater, a spray coater, a spin coater, and the like can be utilized. With respect to these matters, *Latest Coating Technologies*, published by Sogo Gijutsu Center K.K. (Mary 31, 1983) can be made hereof by reference.

In the case of a magnetic tape, with respect to the coating layer of the coating liquid for magnetic layer, the ferromagnetic metal powder contained in the coating layer of the coating liquid for magnetic layer is subjected to a magnetic orientation treatment with a cobalt magnet or a olenoid in the machine direction. In the case of a disc, although sufficient isotropic orientation properties may possibly be obtained without subjecting to orientation using an orientation device, it is preferred to alternately align cobalt magnets in the oblique direction or to use a known random orientation device involving, for example, applying an alternating magnetic field using a solenoid. In the case of the ferromagnetic metal powder, with respect to the isotropic orientation as referred to herein, in general, in-plane two-dimensional random is preferable, but three-dimensional random can be employed by imparting a vertical component. In the case of the hexagonal ferrite, in general, the orientation is liable to become three-dimensional random within the plane and in the vertical direction, but it is possible to employ in-plane two-dimensional random. Also, it is possible to impart an isotropic magnetic characteristic in the peripheral direction by vertical orientation according to a known method involving, for example, applying heteropolar facing magnets. In particular, in the case of carrying out high-density recording, the vertical orientation is preferable. Also, it is possible to carry out peripheral orientation using a spin coater.

It is preferable that the drying position of the coating film can be controlled by controlling the temperature and volume of drying air and the coating rate. The coating rate is preferably from 20 m/min to 1,000 m/min; and the temperature of the drying air is preferably 60° C. or higher. Also, it is possible to carry out proper preliminary drying before entering the magnet zone.

After drying, the coating layer is usually subjected to a surface smoothening treatment. For the surface smoothening treatment, for example, supercalender rolls and the like are utilized. By carrying out the surface smoothening treatment, voids generated by the removal of the solvent at the time of drying disappear, whereby the packing density of the ferromagnetic metal powder in the magnetic layer is enhanced. Accordingly, a magnetic recording medium having a high electromagnetic conversion characteristic can be obtained. As rolls for the calender treatment, heat resistant plastic rolls such as epoxy, polyimide, polyamide, or polyamideimide rolls are used. Also, the treatment can be carried out using metal rolls.

It is preferable that the magnetic recording medium of the invention has a surface having extremely excellent smoothness such that the center plane average height of the surface is in the range of from 0.1 to 4 nm, and preferably from 1 to 3 nm in terms of the cut-off value. For example, its method is carried out by subjecting the magnetic layer which is formed by selecting the specific ferromagnetic metal powder and binder as described previously to the foregoing calender treatment. The calender treatment is carried out by actuating the rolls under conditions at a calender roll temperature in the range of from 60 to 100° C., preferably in the range of from 70 to 100° C., and especially preferably in the range of from 80 to 100° C. and under a pressure in the range of from 100 to 500 kg/cm (from 98 to 490 kN/m), preferably in the range of from 200 to 450 kg/cm (from 196 to 441 kN/m), and especially preferably in the range of from 300 to 400 kg/cm (from 294 to 392 kN/m).

Examples of means for reducing the rate of heat shrinkage include a method of carrying out the heat treatment in the web form while handling at a low tension and a method of carrying out the heat treatment in the bulk state or the laminated state of a tape such as the built-in state in a cassette (thermo-treatment method), and the both can be utilized. The thermo-treatment method is preferable from the viewpoint of providing a magnetic recording medium having a high output and a low noise.

The obtained magnetic recording medium can be cut into a desired size using a cutting machine, etc. and then provided for use. The cutting machine is not particularly limited. However, ones provided with a plurality of pairs of rotating upper blade (male blade) and lower blade (female blade) are preferable, and the slitting rate, the contact depth, the peripheral speed ratio of the upper blade (male blade) to the lower blade (female blade) (peripheral speed of upper blade/peripheral speed of lower blade), the continuous use time of the slit blades, and so on are adequately chosen.

[Physical Characteristics]

The saturation magnetic flux density of the magnetic layer of the magnetic recording medium to be used in the invention is preferably from 100 to 300 mT. Also, the coercive force (Hc) of the magnetic layer is from 143.3 to 318.4 kA/m (from 1,800 to 4,000 Oe), and more preferably from 159.2 to 278.6 kA/m (from 2,000 to 3,500 Oe). The distribution of the coercive force is preferably narrow. The SFD and SFDr are each preferably not more than 0.6, and more preferably not more than 0.2.

The coefficient of friction of the magnetic recording medium to be used in the invention against the head is not more than 0.5, and preferably not more than 0.3 within the range wherein the temperature is from −10 to 40° C. and the humidity is from 0 to 95%. Also, the surface intrinsic resistance is preferably from $10^4$ to $10^{12}$ Ω/sq on the magnetic surface; and the charge potential is preferably within the range of from −500 V to +500 V. The magnetic layer preferably has an elastic modulus at 0.5% elongation of from 0.98 to 19.6 GPa (from 100 to 2,000 kg/mm$^2$) in the respective directions within the plane and a breaking strength of from 98 to 686 MPa (from 10 to 70 kg/mm$^2$). The magnetic recording medium preferably has an elastic modulus of from 0.98 to 14.7 GPa (from 100 to 1,500 kg/mm$^2$) in the respective directions within the plane, a residual elongation of not more than 0.5%, and a rate of heat shrinkage of not more than 1%, more preferably not more than 0.5%, and most preferably not more than 0.1% at any temperature of not more than 100° C.

The glass transition temperature (the maximum point of a loss elastic modulus in the measurement of dynamic viscoelasticity at 110 Hz) is preferably from 50 to 180° C. for the magnetic layer and from 0 to 180° C. for the non-magnetic layer, respectively. The loss elastic modulus is preferably in the range of from $1×10^7$ to $8×10^8$ Pa (from $1×10^8$ to $8×10^9$ dyne/cm$^2$), and the loss tangent is preferably not more than 0.2. When the loss tangent is too large, adhesive failure is liable to take place. It is preferable that these thermal characteristics or mechanical characteristics are substantially equal within 10% in the respective directions within the plane of the medium.

The amount of the residual solvent contained in the magnetic layer is preferably not more than 100 mg/m$^2$, and more preferably not more than 10 mg/m$^2$. The porosity which the coating layer has is preferably not more than 30% by volume, and more preferably not more than 20% by volume in both the non-magnetic layer and the magnetic layer. For the sake of achieving a high output, the porosity is preferably high. However, there may be the case where it is better to ensure a certain value of the porosity depending upon the purpose. For example, in a disc medium in which the repeated application is considered important, a larger porosity is often preferable in view of the running durability.

The magnetic layer preferably has a maximum height $SR_{max}$ of not more than 0.5 µm, a ten-point average roughness SRz of not more than 0.3 µm, a center plane profile peak height SRp of not more than 0.3 µm, a center plane profile valley depth SRv of not more than 0.3 µm, a center plane area rate SSr of from 20 to 80%, an average wavelength Sλa of from 5 to 300 sum. These physical characteristics can be easily controlled by controlling the surface properties by the filler of the polymer support or by the roll surface shape of the calender treatment. The curl is preferably adjusted within ±3 mm.

In the case where the magnetic recording medium of the invention is constructed of the non-magnetic layer and the magnetic layer, these physical characteristics can be changed by the non-magnetic layer and the magnetic layer depending upon the purpose. For example, it is possible to improve the tough with a head by making the elastic modulus of the magnetic layer high to enhance the running durability and simultaneously making the elastic modulus of the non-magnetic layer lower than that of the magnetic layer.

EXAMPLES

The invention will be more specifically described below with reference to the following Examples. Incidentally, the compositions, proportions, operations, orders, etc. as indicated herein can be changed so far as they do not fall outside the spirit of the invention. Also, it should be construed that the invention is never limited to the following Examples. Also, all "parts" used in the Examples mean a part by weight unless otherwise indicated.

Examples of the First Embodiment

Example 1

Preparation of coating material 1 for magnetic layer:

| | |
|---|---|
| Ferromagnetic acicular metal powder:<br>Composition: Fe/Co/Al/Y = 67/20/8/5<br>Surface treated layer: $Al_2O_3$, $Y_2O_3$<br>Coercive force (Hc): 183 kA/m<br>Crystallite size: 12.5 nm<br>Average major axis length: 45 nm<br>Average acicular ratio: 6<br>BET specific surface area ($S_{BET}$): 46 $m^2$/g<br>Saturation magnetization (σs): 140 A · $m^2$/kg | 100 parts |
| Polyurethane resin:<br>Branched chain-containing polyester polyol/<br>diphenylmethane diisocyanate based resin,<br>polar group: —$SO_3Na$ = 70 eq/ton (content) | 12 parts |
| Phenylphosphonic acid: | 3 parts |
| α-$Al_2O_3$ (mean grain size: 0.06 μm): | 2 parts |
| Carbon black (mean grain size: 20 nm): | 2 parts |
| Cyclohexanone: | 110 parts |
| Methyl ethyl ketone: | 100 parts |
| Toluene: | 100 parts |
| Butyl stearate: | 2 parts |
| Stearic acid: | 1 part |

Preparation of coating material 1 for non-magnetic layer:

| | |
|---|---|
| Non-magnetic inorganic metal powder:<br>α-Iron oxide<br>Surface treated layer: $Al_2O_3$, $SiO_2$<br>Average major axis length: 0.15 nm<br>Tap density: 0.8 g/mL<br>Average acicular ratio: 7<br>$S_{BET}$: 52 $m^2$/g<br>pH: 8<br>DBP oil absorption: 33 mL/100 g | 85 parts |
| Carbon black:<br>DBP oil absorption: 120 mL/100 g<br>pH: 8<br>$S_{BET}$: 250 $m^2$/g<br>Volatile matter content: 1.5% | 20 parts |
| Polyurethane resin:<br>Branched chain-containing polyester polyol/<br>diphenylmethane diisocyanate based resin,<br>polar group: —$SO_3Na$ = 70 eq/ton (content) | 12 parts |
| Acrylic resin:<br>Benzyl methacrylate/diacetone acrylamide based<br>resin, polar group: —$SO_3Na$ = 60 eq/ton (content) | 6 parts |
| Phenylphosphonic acid: | 3 parts |
| α-$Al_2O_3$ (mean grain size: 0.2 μm): | 1 part |
| Cyclohexanone: | 140 parts |
| Methyl ethyl ketone: | 170 parts |
| Butyl stearate: | 2 parts |
| Stearic acid: | 1 part |

With respect to each of the foregoing coating material 1 for magnetic layer and coating material 1 for non-magnetic layer, the respective components were kneaded in an open kneader for 60 minutes and then dispersed in a sand mill for 120 minutes. To each of the resulting dispersion liquids, 6 parts of a trifunctional low-molecular weight polyisocyanate compound (Coronate 3041, manufactured by Nippon Polyurethane Industry Co., Ltd.) was added, and the mixture was further mixed with stirring for 20 minutes. The resulting mixture was filtered using a filter having a mean pore size of 1 μm to prepare a magnetic coating material 1 and a non-magnetic coating material 1.

On a previously corona-treated polyethylene terephthalate support having a thickness of 7 μm and an intrinsic viscosity of 0.47 dL/g and composed of two layers, in which the magnetic layer coating surface (A surface) and the back surface (B surface) against the magnetic layer coating surface had a roughness (SRa) of 3.0 nm and 8.0 nm, respectively, the foregoing coating material liquid for non-magnetic layer was dried in a thickness after drying of 1.5 μm, and immediately thereafter, the coating material liquid for magnetic layer was subjected to simultaneous multilayer-coating in a thickness after drying of 0.1 μm. The sample was subjected to magnetic field orientation using a 300-mT magnet in the state where the magnetic layer and the non-magnetic layer were still wet. After drying, the sample was further subjected to a surface smoothening treatment using a 7-stage calender constructed only of a metal roll at a speed of 100 m/min, a linear pressure of 300 kg/cm (294 kN/m) and a temperature of 90° C. Thereafter, a back layer having a thickness of 0.5 μm (prepared by dispersing 100 parts of carbon black having a mean grain size of 17 nm, 80 parts of calcium carbonate having a mean grain size of 40 nm, and 5 parts of α-alumina having a mean grain size of 200 nm in a nitrocellulose resin, a polyurethane resin and a polyisocyanate) was coated. Thereafter, the sample was heat treated at 70° C. for 48 hours and slit into a width of ½ inch to prepare a magnetic tape.

Examples 2 to 3 and 4 to 7

Respective magnetic tapes were prepared in the same manner as in Example 1, except for changing the polyethylene terephthalate support (polymer support) as shown in Table 1.

Example 4

A magnetic tape was prepared in the same manner as in Example 3, except for using a coating material for forming a magnetic layer or a non-magnetic layer as prepared using the following coating material 2 for magnetic layer and coating material 2 for non-magnetic layer in place of the coating material 1 for magnetic layer and the coating material 1 for non-magnetic layer, respectively.

Coating material 2 for magnetic layer (hexagonal ferrite):

| | |
|---|---|
| Barium ferrite magnetic powder (average tabular diameter: 30 nm) | 100 parts |
| Vinyl chloride based copolymer:<br>MR555 (manufactured by Zeon Corporation) | 6 parts |
| polyurethane resin:<br>UR8200 (manufactured by Toyobo Co., Ltd.) | 3 parts |
| α-Alumina (mean grain size: 0.3 μm):<br>HIT55 (manufactured by Sumitomo Chemical Co., Ltd.) | 2 parts |
| Carbon black (mean grain size: 0.015 μm):<br>#55 (manufactured by Asahi Carbon Co., Ltd.) | 5 parts |
| Butyl stearate: | 1 part |
| Stearic acid: | 2 parts |
| Methyl ethyl ketone: | 125 parts |
| Cyclohexanone: | 125 parts |

Coating material 2 for non-magnetic layer:

| | |
|---|---|
| Non-magnetic powder, αFe₂O₃ (hematite): (Average major axis length: 0.15 μm, specific surface area by the BET method: 52 m²/g, pH: 8, tap density: 0.8, DBP oil absorption: 27 to 38 mL/100 g, surface coating compound: Al₂O₃, SiO₂) | 80 parts |
| Carbon black: (Mean grain size: 16 nm, DBP oil absorption: 80 mL/100 g, pH: 8.0, specific surface area by the BET method: 250 m²/g, volatile matter content: 1.5%) | 20 parts |
| Vinyl chloride based copolymer: (MR-110, manufactured by Zeon Corporation) | 12 parts |
| Polyester polyurethane resin: | 5 parts |
| α-Al₂O₃ (mean grain size: 0.2 μm): | 1 part |
| Butyl stearate: | 1 part |
| Stearic acid: | 1 part |
| Methyl ethyl ketone: | 100 parts |
| Cyclohexanone: | 50 parts |
| Toluene: | 50 parts |

With respect to each of the foregoing coating material 2 for magnetic layer and coating material 2 for non-magnetic layer, the respective components were kneaded in a kneader and then dispersed in a sand mill for 4 hours. To each of the resulting dispersion liquids, 3 parts of a polyisocyanate was added. Further, 40 parts of cyclohexanone was added to each of the mixture, followed by filtration using a filter having a mean pore size of 1 μm to prepare a coating liquid for forming the magnetic layer and a coating liquid for forming the non-magnetic layer.

Comparative Examples 1 to 4

Magnetic tapes of Comparative Examples 1 to 4 were prepared in the same manner as in Example 1, except for changing the polyethylene terephthalate as shown in Table 1.

The performance of the resulting samples was evaluated in the following manners. The results obtained are shown in Table 1.

<Measurement Method>
1. Measurement of intrinsic viscosity of polymer support:
    The polymer support was dissolved in a mixed solvent of phenol/1,1,2,2-tetrachloroethane (weight ratio: 60/40), and its intrinsic viscosity was measured at 25° C. using an automatic viscometer having an Ubbelohde's viscometer set therein.
2. Measurement of tensile characteristics (Young's modulus and breaking strength) of polymer support:
    The Young's modulus and breaking strength were measured at a specimen length of 100 mm, a width of 5 mm and a drawing rate of 100 mm/min under the circumstance at 25° C. and 50% RH using a Strograph V1-C model tensile tester manufactured by Toyo Seiki Seisaku-sho, Ltd. according the method defined in JIS K7113 (1995).
3. Measurement of contact stylus three-dimensional surface roughness (SRa) of polymer support by contact stylus three-dimensional surface roughness analyzer:
    The SRa (of the A surface and the B surface) was measured using a contact stylus surface roughness measuring instrument manufactured by Kosaka Laboratory Ltd. according to JIS B06101.
4. Measurement of amount of edge debris:
    The resulting tape was run with 200 passes over the overall length under the circumstance at 5° C. and 80% RH, and after completion of running, the presence of a stain of the head was judged.
    The case where no stain was observed is defined as "○"; the case where stains were slightly observed but did not affect the recording and reproducing head portions is defined as "Δ"; and the case where stains adhered even to the recording and reproducing head portions is defined as "x".
5. Error rate (at the initial stage and after the preservation):
    Using a magnetic tape immediately after the production, a recording signal was recorded and reproduced at 25° C. and 50% RH in an 8-10 conversion PI equalization mode, thereby measuring the error rate (at the initial stage). Using a magnetic tape immediately after the production, a recording signal was recorded in the same manner as described previously, preserved in the circumstance at 25° C. and 50% RH for one week, and then reproduced, thereby measuring the error rate (after the preservation).

TABLE 1

| | Polymer support | | | | | | | |
|---|---|---|---|---|---|---|---|---|
| | Intrinsic | | Surface roughness (SRa) | | Young's modulus | | Breaking strength | |
| No. | viscosity dL/g | Thickness μm | A surface nm | B surface nm | MD GPa | TD GPa | MD MPa | TD Mpa |
| Example 1 | 0.47 | 7.0 | 3.0 | 8.0 | 7.9 | 6.0 | 450 | 380 |
| Example 2 | 0.49 | 7.0 | 3.0 | 8.0 | 7.8 | 6.2 | 469 | 406 |
| Example 3 | 0.49 | 4.5 | 3.0 | 8.0 | 7.8 | 6.2 | 469 | 406 |
| Example 4 | 0.49 | 4.5 | 3.0 | 8.0 | 7.8 | 6.2 | 469 | 406 |
| Example 5 | 0.49 | 7.0 | 3.0 | 8.0 | 8.2 | 5.8 | 499 | 384 |
| Example 6 | 0.49 | 7.0 | 3.0 | 8.0 | 7.0 | 7.0 | 429 | 450 |
| Example 7 | 0.51 | 7.0 | 3.0 | 8.0 | 7.8 | 6.2 | 493 | 421 |
| Comparative Example 1 | 0.45 | 7.0 | 3.0 | 8.0 | 6.7 | 7.0 | 366 | 419 |
| Comparative Example 2 | 0.50 | 7.0 | 3.0 | 8.0 | 6.8 | 7.1 | 431 | 463 |
| Comparative Example 3 | 0.50 | 7.0 | 3.0 | 8.0 | 5.4 | 13.4 | 361 | 560 |
| Comparative Example 4 | 0.52 | 7.0 | 3.0 | 8.0 | 8.8 | 5.9 | 547 | 367 |

TABLE 1-continued

| | Ferromagnetic powder | | | Evaluation results | |
|---|---|---|---|---|---|
| | | Average major axis length or | | Error rate | |
| No. | Type | average tabular diameter Nm | Edge debris | At the initial stage ×10⁻⁵ | After the preservation ×10⁻⁵ |
| Example 1 | Fe alloy | 45 | ○ | 0.10 | 0.13 |
| Example 2 | Fe alloy | 45 | ○ | 0.11 | 0.15 |
| Example 3 | Fe alloy | 45 | ○ | 0.13 | 0.16 |
| Example 4 | BaFe | 30 | ○ | 0.12 | 0.15 |
| Example 5 | Fe alloy | 45 | ○ | 0.09 | 0.16 |
| Example 6 | Fe alloy | 45 | ○ | 0.15 | 0.19 |
| Example 7 | Fe alloy | 45 | ○ | 0.10 | 0.15 |
| Comparative Example 1 | Fe alloy | 45 | Δ | 0.18 | 1.58 |
| Comparative Example 2 | Fe alloy | 45 | X | 0.17 | 1.43 |
| Comparative Example 3 | Fe alloy | 45 | X | 0.24 | 3.56 |
| Comparative Example 4 | Fe alloy | 45 | X | 0.16 | 1.56 |

According to the Examples of the first embodiment of the invention, the Examples are extremely small in the amount of edge debris and low in the error rate at the initial stage and after the preservation. On the other hand, the Comparative Examples are large in the amount of edge debris and high in the error rate at the initial stage and after the preservation. Thus, the invention gives rise to marked effects as compared with the conventional method.

Examples of the Second Embodiment

Example 8

Preparation of coating material 1 for magnetic layer:

| | |
|---|---|
| Ferromagnetic acicular metal powder: | 100 parts |
| Composition: Fe/Co/Al/Y = 67/20/8/5 | |
| Surface treated layer: Al$_2$O$_3$, Y$_2$O$_3$ | |
| Coercive force (Hc): 183 kA/m | |
| Crystallite size: 12.5 nm | |
| Average major axis length: 45 nm | |
| Average acicular ratio: 6 | |
| BET specific surface area (S$_{BET}$): 46 m$^2$/g | |
| Saturation magnetization (σs): 140 A · m$^2$/kg | |
| Polyurethane resin: | 12 parts |
| Branched chain-containing polyester polyol/ | |
| diphenylmethane diisocyanate based resin, | |
| polar group: —SO$_3$Na = 70 eq/ton (content) | |
| Phenylphosphonic acid: | 3 parts |
| α-Al$_2$O$_3$ (mean grain size: 0.06 μm): | 2 parts |
| Carbon black (mean grain size: 20 nm): | 2 parts |
| Cyclohexanone: | 110 parts |
| Methyl ethyl ketone: | 100 parts |
| Toluene: | 100 parts |
| Butyl stearate: | 2 parts |
| Stearic acid: | 1 part |

Preparation of coating material 1 for non-magnetic layer:

| | |
|---|---|
| Non-magnetic inorganic metal powder: | 85 parts |
| α-Iron oxide | |
| Surface treated layer: Al$_2$O$_3$, SiO$_2$ | |
| Average major axis length: 0.15 nm | |
| Tap density: 0.8 g/mL | |
| Average acicular ratio: 7 | |
| S$_{BET}$: 52 m$^2$/g | |
| pH: 8 | |
| DBP oil absorption: 33 mL/100 g | |
| Carbon black: | 20 parts |
| DBP oil absorption: 120 mL/100 g | |
| pH: 8 | |
| S$_{BET}$: 250 m$^2$/g | |
| Volatile matter content: 1.5% | |
| Polyurethane resin: | 12 parts |
| Branched chain-containing polyester polyol/ | |
| diphenylmethane diisocyanate based resin, | |
| polar group: —SO$_3$Na = 70 eq/ton (content) | |
| Acrylic resin: | 6 parts |
| Benzyl methacrylate/diacetone acrylamide based | |
| resin, polar group: —SO$_3$Na = 60 eq/ton (content) | |
| Phenylphosphonic acid: | 3 parts |
| α-Al$_2$O$_3$ (mean grain size: 0.2 μm): | 1 parts |
| Cyclohexanone: | 140 parts |
| Methyl ethyl ketone: | 170 parts |
| Butyl stearate: | 2 parts |
| Stearic acid: | 1 part |

With respect to each of the foregoing coating material 1 for magnetic layer and coating material 1 for non-magnetic layer, the respective components were kneaded, in an open kneader for 60 minutes and then dispersed in a sand mill for 120 minutes. To each of the resulting dispersion liquids, 6 parts of a trifunctional low-molecular weight polyisocyanate compound (Coronate 3041, manufactured by Nippon Polyurethane Industry Co., Ltd.) was added, and the mixture was further mixed with stirring for 20 minutes. The resulting mixture was filtered using a filter having a mean pore size of 1 μm to prepare a magnetic coating material 1 and a non-magnetic coating material 1.

On a previously corona-treated polyethylene terephthalate support having a thickness of 6.9 μm, an Mn of 14,000 and an Mw of 33,000 and composed of two layers, in which the magnetic layer coating surface (A surface) and the back surface (B surface) against the magnetic layer coating surface had a roughness (SRa) of 3.2 nm and 7.6 nm, respectively, the foregoing coating material liquid for non-magnetic layer was dried in a thickness after drying of 1.5 μm, and immediately thereafter, the coating material liquid for magnetic layer was subjected to simultaneous multilayer-coating in a thickness after drying of 0.1 µm. The sample was subjected to magnetic field orientation using a 300-mT magnet in the state where the magnetic layer and the non-magnetic layer were still wet. After drying, the sample was further subjected to a surface smoothening treatment using a 7-stage calender constructed only of a metal roll at a speed of 100 m/min, a linear pressure of 300 kg/cm (294 kN/m) and a temperature of 90° C. Thereafter, a back layer having a thickness of 0.5 µm (prepared by dispersing 100 parts of carbon black having a mean grain size of 17 nm, 80 parts of calcium carbonate having a mean grain size of 40 nm, and 5 parts of α-alumina having a mean grain size of 200 nm in a nitrocellulose resin, a polyurethane resin and a polyisocyanate) was coated. Thereafter, the sample was heat treated at 70° C. for 48 hours and slit into a width of ½ inch to prepare a magnetic tape.

Examples 9 to 11

Respective magnetic tapes were prepared in the same manner as in Example 8, except for changing the polyethylene terephthalate support (polymer support) as shown in Table 2.

Example 10

A magnetic tape was prepared in the same manner as in Example 9, except for using a coating material for forming a magnetic layer or a non-magnetic layer as prepared using the following coating material 2 for magnetic layer and coating material 2 for non-magnetic layer in place of the coating material 1 for magnetic layer and the coating material 1 for non-magnetic layer, respectively.

Coating material 2 for magnetic layer (hexagonal ferrite):

| | |
|---|---|
| Barium ferrite magnetic powder (average tabular diameter: 30 nm): | 100 parts |
| Vinyl chloride based copolymer: MR555 (manufactured by Zeon Corporation) | 6 parts |
| Polyurethane resin: UR8200 (manufactured by Toyobo Co., Ltd.) | 3 parts |
| α-Alumina (mean grain size: 0.3 µm): HIT55 (manufactured by Sumitomo Chemical Co., Ltd.) | 2 parts |
| Carbon black (mean grain size: 0.015 µm): #55 (manufactured by Asahi Carbon Co., Ltd.) | 5 parts |
| Butyl stearate: | 1 part |
| Stearic acid: | 2 parts |
| Methyl ethyl ketone: | 125 parts |
| Cyclohexanone: | 125 parts |

Coating material 2 for non-magnetic layer:

| | |
|---|---|
| Non-magnetic powder, $\alpha Fe_2O_3$ (hematite): (Average major axis length: 0.15 µm, specific surface area by the BET method: 52 m²/g, pH: 8, tap density: 0.8, DBP oil absorption: 27 to 38 Ml/100 g, surface coating compound: $Al_2O_3$, $SiO_2$) | 80 parts |
| Carbon black: (Mean grain size: 16 nm, DBP oil absorption: 80 mL/100 g, pH: 8.0, specific surface area by the BET method: 250 m²/g, volatile matter content: 1.5%) | 20 parts |
| Vinyl chloride based copolymer: (MR-110, manufactured by Zeon Corporation) | 12 parts |
| Polyester polyurethane resin: | 5 parts |
| α-$Al_2O_3$ (mean grain size: 0.2 µm): | 1 part |
| Butyl stearate: | 1 part |
| Stearic acid: | 1 part |
| Methyl ethyl ketone: | 100 parts |
| Cyclohexanone: | 50 parts |
| Toluene: | 50 parts |

With respect to each of the foregoing coating material 2 for magnetic layer and coating material 2 for non-magnetic layer, the respective components were kneaded in a kneader and then dispersed in a sand mill for 4 hours. To each of the resulting dispersion liquids, 3 parts of a polyisocyanate was added. Further, 40 parts of cyclohexanone was added to each of the mixture, followed by filtration using a filter having a mean pore size of 1 µm to prepare a coating liquid for forming the magnetic layer and a coating liquid for forming the non-magnetic layer.

Comparative Examples 5 to 8

Magnetic tapes of Comparative Examples 5 to 8 were prepared in the same manner as in Example 8, except for changing the polyethylene terephthalate as shown in Table 2.

The performance of the resulting samples was evaluated in the following manners. The results obtained are shown in Table 2.

<Measurement Method>

1. Measurement of Mn and Mw of polymer support:

The polymer support was dissolved in hexafluoroisopropanol (HFIP), and the Mn and Mw of the polymer support were determined from a calibration curve prepared using polymethyl methacrylate (PMMA) having a known molecular weight in GPC, HLC-8220 manufactured by Tosoh Corporation (column construction: Super HM-M×2, column vessel temperature: 40° C.) while using the same HFIP as an eluting solution.

2. Measurement of tensile characteristics (Young's modulus and breaking strength) of polymer support:

The Young's modulus and breaking strength were measured at a specimen length of 100 mm, a width of 5 mm and a drawing rate of 100 mm/min under the circumstance at 25° C. and 50% RH using a Strograph V1-C model tensile tester manufactured by Toyo Seiki Seisaku-sho, Ltd. according the method defined in JIS K7113 (1995).

3. Measurement of contact stylus three-dimensional surface roughness (SRa) of polymer support by contact stylus three-dimensional surface roughness analyzer:

The SRa (of the A surface and the B surface) was measured using a contact stylus surface roughness measuring instrument manufactured by Kosaka Laboratory Ltd. according to JIS B06101.

4. Measurement of amount of edge debris:

The resulting tape was run with 200 passes over the overall length under the circumstance at 5° C. and 80% RH, and after completion of running, the presence of a stain of the head was judged.

The case where no stain was observed is defined as "○"; the case where stains were slightly observed but did not affect the recording and reproducing head portions is defined as "Δ"; and the case where stains adhered even to the recording and reproducing head portions is defined as "×".

5. Error rate (at the initial stage and after the preservation):

Using a magnetic tape immediately after the production, a recording signal was recorded and reproduced at 25° C. and 50% RH in an 8-10 conversion PI equalization mode, thereby measuring the error rate (at the initial stage). Using a magnetic tape immediately after the production, a recording signal was recorded in the same manner as described previously, preserved in the circumstance at 25° C. and 50% RH for one week, and then reproduced, thereby measuring the error rate (after the preservation).

TABLE 2

| | Polymer support | | | | | | |
|---|---|---|---|---|---|---|---|
| | Molecular weight | | | Surface roughness (SRa) | | Young's modulus | |
| No. | Number average Mn | Weight average Mw | Thickness μm | A surface nm | B surface nm | MD GPa | TD GPa |
| Example 8 | 14000 | 33000 | 6.9 | 3.2 | 7.6 | 7.8 | 6.0 |
| Example 9 | 16000 | 37000 | 6.9 | 3.2 | 7.6 | 7.9 | 6.2 |
| Example 10 | 16000 | 37000 | 6.9 | 3.2 | 7.6 | 7.9 | 6.2 |
| Example 11 | 18000 | 39000 | 6.9 | 3.2 | 7.6 | 8.0 | 6.4 |
| Comparative Example 5 | 8000 | 20000 | 6.9 | 3.2 | 7.6 | 6.6 | 6.9 |
| Comparative Example 6 | 10000 | 25000 | 6.9 | 3.2 | 7.6 | 6.8 | 7.1 |
| Comparative Example 7 | 16000 | 37000 | 6.9 | 3.2 | 7.6 | 6.9 | 7.3 |
| Comparative Example 8 | 20000 | 42000 | 6.9 | 3.2 | 7.6 | 8.0 | 6.6 |

| | Ferromagnetic powder | | | Evaluation results | | |
|---|---|---|---|---|---|---|
| | | Average major axis length or average tabular diameter | | | Error rate | |
| No. | Type | Nm | Edge debris | At the initial stage ×10$^{-5}$ | At the preservation ×10$^{-5}$ | |
| Example 8 | Fe alloy | 45 | ○ | 0.09 | 0.12 | |
| Example 9 | Fe alloy | 45 | ○ | 0.12 | 0.17 | |
| Example 10 | BaFe | 30 | ○ | 0.11 | 0.16 | |
| Example 11 | Fe alloy | 45 | ○ | 0.14 | 0.19 | |
| Comparative Example 5 | Fe alloy | 45 | X | 0.25 | 2.59 | |
| Comparative Example 6 | Fe alloy | 45 | X | 0.28 | 3.83 | |
| Comparative Example 7 | Fe alloy | 45 | X | 0.23 | 3.66 | |
| Comparative Example 8 | Fe alloy | 45 | Δ | 0.22 | 1.56 | |

According to the Examples of the second embodiment of the invention, the Examples are extremely small in the amount of edge debris and low in the error rate at the initial stage and after the preservation. On the other hand, the Comparative Examples are large in the amount of edge debris and high in the error rate at the initial stage and after the preservation. Thus, the invention gives rise to marked effects as compared with the conventional method.

What is claimed is:

1. A magnetic recording medium comprising: a polymer support; and at least one magnetic layer containing a binder and one of a ferromagnetic metal powder having an average major-axis length of from 20 to 100 nm and a ferromagnetic hexagonal ferrite powder having an average tabular diameter of from 5 to 40 nm, wherein the polymer support has an intrinsic viscosity of from 0.47 to 0.51 dL/g, a Young's modulus in a machine direction of from 7.0 to 8.6 GPa, a Young's modulus in a transverse direction of from 5.4 to 8.0 GPa, and a breaking strength in the transverse direction of from 370 to 450 MPa.

2. The magnetic recording medium according to claim 1, wherein:

the polymer support is a laminated polyester film having a thickness of not more than 8 μm and comprising at least a first layer and a second layer;

the first layer is provided at one side where the magnetic layer is formed, and has a first contact stylus three-dimensional surface roughness of from 1 to 6 nm;

the second layer is provided at opposite side, and has a second contact stylus three-dimensional surface roughness of 6 to 10 nm; and the first contact stylus three-dimensional surface is smaller than the second contact stylus three-dimensional surface roughness.

3. The magnetic recording medium according to claim 1, wherein the intrinsic viscosity is from 0.47 to 0.50 dL/g.

4. The magnetic recording medium according to claim 1, wherein the Young's modulus in a machine direction is from 7.0 to 8.5 GPa, and the Young's modulus in a transverse direction is 5.6 to 7.8 Gpa.

5. The magnetic recording medium according to claim 2, wherein the first contact stylus three-dimensional surface is from 1.5 to 5.5 nm, and the second contact stylus three-dimensional surface roughness is from 6.5 to 9.0.

6. The magnetic recording medium according to claim 2, wherein the first layer contains a fine grain having an average diameter of from 30 to 150 nm at a ratio of not more than 0.1% by weight.

7. The magnetic recording medium according to claim 6, wherein the fine grain is selected from at least one of silica, calcium carbonate, alumina, a polyacrylic grain, and a polystyrene grain.

8. A magnetic recording medium comprising: a polymer support; and at least one magnetic layer containing a binder and one of a ferromagnetic metal powder having an average major-axis length of from 20 to 100 nm and a ferromagnetic hexagonal ferrite powder having an average tabular diameter of from 5 to 40 nm, wherein the polymer support has a number average molecular weight of from 12,000 to 18,000, a weight average molecular weight of from 32,000 to 40,000, a Young's modulus in a machine direction of from 7.0 to 8.6 GPa, and a Young's modulus in a transverse direction of from 5.4 to 8.0 GPa.

9. The magnetic recording medium according to claim 8, wherein:

the polymer support is a laminated polyester film having a thickness of not more than 8 μm and comprising at least a first layer and a second layer;

the first layer is provided at one side where the magnetic layer is formed, and has a first contact stylus three-dimensional surface roughness of from 1 to 6 nm;

the second layer is provided at opposite side, and has a second contact stylus three-dimensional surface roughness of 6 to 10 nm; and the first contact stylus three-dimensional surface is smaller than the second contact stylus three-dimensional surface roughness.

10. The magnetic recording medium according to claim 8, wherein the number average molecular weight is from 14,000 to 17,000, and the weight average molecular weight is from 33,000 to 38,000.

11. The magnetic recording medium according to claim 8, wherein the Young's modulus in a machine direction is from 7.0 to 8.5 GPa, and the Young's modulus in a transverse direction is 5.6 to 7.8 Gpa.

12. The magnetic recording medium according to claim 9, wherein the first contact stylus three-dimensional surface is from 1.5 to 5.5 nm, and the second contact stylus three-dimensional surface roughness is from 6.5 to 9.0.

13. The magnetic recording medium according to claim 9, wherein the second layer contains a fine grain having an average diameter of from 80 to 800 nm at a ratio of from 0.08 to 0.8% by weight.

14. The magnetic recording medium according to claim 13, wherein the fine grain is selected from at least one of calcium carbonate, silica, alumina, a polystyrene grain, and a silicone resin grain.

15. A magnetic recording medium comprising: a polymer support; and at least one magnetic layer containing a binder and one of a ferromagnetic metal powder having an average major-axis length of from 20 to 100 nm and a ferromagnetic hexagonal ferrite powder having an average tabular diameter of from 5 to 40 nm, wherein the polymer support has an intrinsic viscosity of from 0.47 to 0.50 dL/g, a number average molecular weight of from 12,000 to 18,000, a weight average molecular weight of from 32,000 to 40,000, a Young's modulus in a machine direction of from 7.0 to 8.6 GPa, a Young's modulus in a transverse direction of from 5.4 to 8.0 GPa, and a breaking strength in the transverse direction of from 370 to 450 MPa.

* * * * *